United States Patent
Deng et al.

(10) Patent No.: US 10,834,414 B2
(45) Date of Patent: Nov. 10, 2020

(54) TRANSCODE PCL DELTA-ROW COMPRESSED IMAGE TO EDGES

(71) Applicant: CANON KABUSHIKI KAISHA, Tokyo (JP)

(72) Inventors: Dixon De Sheng Deng, East Ryde (AU); David Anthony Lawler, Cherrybrook (AU)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 15/839,084

(22) Filed: Dec. 12, 2017

(65) Prior Publication Data

US 2018/0176589 A1  Jun. 21, 2018

(30) Foreign Application Priority Data

Dec. 16, 2016 (AU) .................. 2016273973

(51) Int. Cl.
*H04N 19/40* (2014.01)
*H04N 19/14* (2014.01)
(Continued)

(52) U.S. Cl.
CPC ............... *H04N 19/40* (2014.11); *G06T 7/13* (2017.01); *G06T 7/181* (2017.01); *H04N 1/646* (2013.01); *G06T 2200/28* (2013.01); *G06T 2219/021* (2013.01); *H04N 1/64* (2013.01); *H04N 19/14* (2014.11)

(58) Field of Classification Search
CPC .......... G06K 15/1817; G06K 15/1822; G06K 15/1842; G06K 15/1843; G06K 15/1857; G06K 15/02; G06K 15/1836; G06K 2215/0077; H04N 1/41; H04N 1/642; H04N 19/14; H04N 19/40; H04N 19/436; H04N 19/44; H04N 1/64; H04N 1/646; G06T 2200/28; G06T 2219/021; G06T 7/13; G06T 7/181
See application file for complete search history.

(56) References Cited

U.S. PATENT DOCUMENTS 5,392,071 A   2/1995 Richards et al.
5,452,405 A   9/1995 Vondran
(Continued)

*Primary Examiner* — Kim Y Vu
*Assistant Examiner* — Michael J Vanchy, Jr.
(74) *Attorney, Agent, or Firm* — Canon U.S.A., Inc. IP Division

(57) ABSTRACT

A method of transcoding a delta row encoded image by: receiving the delta row encoded image comprising terms comprising an offset and replacement bytes for each changed portion to the exclusion of storing unchanged portions; subdividing the delta row encoded image into a plurality of delta row encoded tiles based on predetermined tile boundaries; determining, for a row of the delta row encoded image, terms comprising a tile offset and replacement bytes for each changed portion within a delta row encoded tile the tile offsets and the replacement bytes being determined to allow for independent processing of the differentially encoded tiles; determining edges within each of the delta row encoded tiles based on the determined tile offsets, bypassing an edge detection process for unchanged portions of the differentially encoded tile; and transcoding the delta row encoded image by encoding the identified edges.

12 Claims, 32 Drawing Sheets

(51) Int. Cl.
    *G06T 7/13*     (2017.01)
    *H04N 1/64*     (2006.01)
    *G06T 7/181*     (2017.01)

(56) References Cited

U.S. PATENT DOCUMENTS

| | | | |
|---|---|---|---|
| 8,810,587 B2 | 8/2014 | Harris et al. | |
| 9,800,760 B1 * | 10/2017 | Nakahara | H04N 1/41 |
| 2005/0084171 A1 * | 4/2005 | Lapstun | B41J 2/04596 |
| | | | 382/245 |
| 2010/0086225 A1 * | 4/2010 | Yachida | H04N 19/86 |
| | | | 382/239 |

* cited by examiner

2700

|   | 1 | 2 | 3 | 4 | 5 | 6 | 7 | 8 |
|---|---|---|---|---|---|---|---|---|
| 1 | 11 | 22 | 22 | 11 | 11 | 11 | 11 | 11 |
| 2 | 11 | 22 | 33 | 33 | 33 | 11 | 11 | 11 |
| 3 | 11 | 22 | 33 | 33 | 44 | 44 | 44 | 44 |
| 4 | 11 | 22 | 33 | 55 | 55 | 44 | 44 | 44 |
| 5 | 11 | 22 | 33 | 55 | 55 | 55 | 44 | 44 |
| 6 | 11 | 22 | 33 | 55 | 55 | 55 | 55 | 44 |
| 7 | 33 | 33 | 33 | 55 | 55 | 55 | 55 | 44 |
| 8 | 22 | 22 | 33 | 55 | 55 | 55 | 55 | 44 |

2701

| Image Row | DRC term(s) : [row 1 pixels] or (offset, length, [term pixels]) | |
|---|---|---|
| | DRC Terms | Flattened DRC Terms |
| 1 | [11,22,22,11,11,11,11,11] | [11,22,22,11,11,11,11,11] |
| 2 | (2,3,[33,33,33]) | (2,3,[33,33,33]) |
| 3 | (4,4,[44,44,44,44]) | (2,2,[33,33]), (4,4,[44,44,44,44]) |
| 4 | (3,2,[55,55]) | (2,1,[33]), (3,2,[55,55]), (5,3,[44,44,44]) |
| 5 | (5,1,[55]) | (2,1,[33]), (3,3,[55,55,55]), (6,2,[44,44]) |
| 6 | (6,1,[55]) | (2,1,[33]), (3,4,[55,55,55,55]), (7,1,[44]) |
| 7 | (0,2,[33,33]) | (0,3,[33,33,33]), (3,4,[55,55,55,55]), (7,1,[44]) |
| 8 | (0,2,[22,22]) | (0,2,[22,22]), (2,1,[33]), (3,4,[55,55,55,55]), (7,1,[44]) |

2702

|   | 1 | 2 | 3 | 4 | 5 | 6 | 7 | 8 |
|---|---|---|---|---|---|---|---|---|
| 1 | 11 | 22 | 22 | 11 | 11 | 11 | 11 | 11 |
| 2 |  |  | 33 | 33 | 33 |  |  |  |
| 3 |  |  |  |  | 44 | 44 | 44 | 44 |
| 4 |  |  |  | 55 | 55 |  |  |  |
| 5 |  |  |  |  |  | 55 |  |  |
| 6 |  |  |  |  |  |  | 55 |  |
| 7 | 33 | 33 |  |  |  |  |  |  |
| 8 | 22 | 22 |  |  |  |  |  |  |

Fig. 26

TRANSCODE PCL DELTA-ROW COMPRESSED IMAGE TO EDGES

REFERENCE TO RELATED PATENT APPLICATION

This application claims the benefit under 35 U.S.C. § 119 of the filing date of Australian Patent Application No. 2016273973, filed 16 Dec. 2016, hereby incorporated by reference in its entirety as if fully set forth herein.

TECHNICAL FIELD

The present invention relates generally to image transcoding and, in particular, to transcoding from delta-row compressed images to an edge compressed representation.

BACKGROUND

Raster Image Processing refers to the process and apparatus for converting vector digital information, such as an Adobe® PostScript® file, into a high-resolution raster image. A Raster Image Processor (RIP) takes the digital information about fonts and graphics that describes the appearance of a document and translates the information into an image composed of individual pixels for output by an imaging device such as a printer. A number of Raster Image Processors are known in the art. These include frame-store RIP's, band-store RIP's and tile-order RIP's.

In the tile—order RIP, a page is divided up into square tiles. Each tile is fully rendered before the RIP starts rendering the next tile. With such a RIP, the RIP output compressor may start compression of a rendered tile as soon as it is available, provided that the compressor can accept data in tile order.

Images presented to a RIP can each be in one of many formats. One of those formats is Delta-Row Compression (DRC) which is defined in the HP Printer Control Language (PCL) standard. A DRC compressor analyses successive scanlines of an image, and encodes only the changes between scanlines to thereby produce delta row encoded image.

Pixel data generated by a RIP can belong to a number of different region types namely text, graphic, or image regions. Each region type has different characteristics and hence different compression requirements. One common compression method is Edged-based compression. Edge-based algorithms are generally lossless and therefore preserve sharp transitions in colour. Text regions and graphic regions can contain a single colour and therefore can be represented very efficiently using edge-based algorithms since a large area of many pixels can be described with only a single edge. Edge-based algorithms are popular, as they are less affected than most others by increases in resolution or bit depth since the number of edges does not increase as the resolution increases.

Where an image is presented to an RIP encoded with DRC, and the output is to be edge compressed, it is necessary to convert the DRC image to its edge compressed equivalent. The conventional method of achieving this is to decode the DRC image into its un-encoded rows of pixels, and then search for pixel runs in each row and generate edges which are then compressed to produce the edge compressed output. The process of decoding the DRC image and then parsing the entire uncompressed image for pixel runs consumes a significant amount of computing and storage resources.

SUMMARY

It is an object of the present invention to substantially overcome, or at least ameliorate, one or more disadvantages of existing arrangements.

Disclosed are arrangements which seek to address the above problems by converting the DRC data for each image row into DRC data for each tile row, streaming the DRC rows for each tile for concurrent processing to generate edges for each tile, and using the identical pixel sections implied in the DRC data to directly extend edges, rather than decoding the DRC data and then parsing pixel runs According to a first aspect of the present invention, there is provided a method for transcoding a delta row encoded image, the method comprising the steps of:
  receiving the delta row encoded image comprising terms each comprising an offset and replacement bytes for each changed portion to the exclusion of storing unchanged portions;
  subdividing the delta row encoded image into a plurality of delta row encoded tiles based on predetermined tile boundaries;
  determining, for a row of the delta row encoded image, terms comprising a tile offset and replacement bytes for each changed portion within a delta row encoded tile using the predetermined tile boundaries, stored offsets and replacement bytes, the tile offsets and the replacement bytes being determined to allow for independent processing of the differentially encoded tiles;
  determining edges within each of the delta row encoded tiles based on the determined tile offsets, bypassing an edge detection process for unchanged portions of the differentially encoded tile; and
  transcoding the delta row encoded image by encoding the identified edges.

According to another aspect of the disclosed invention, there is provided a method of transcoding a delta row encoded image, the method comprising the steps of:
  receiving a delta row encoded tile comprising terms comprising an offset and replacement bytes for each changed portion to the exclusion of storing unchanged portions;
  parsing a first row of the tile, provided as explicit pixels, to identify pixel runs for the first row;
  generating depending upon the identified pixel runs edges for the first row of the tile;
  partitioning a subsequent current row into changed and unchanged segments depending upon an offset and a length of each term;
  extending edges on the preceding row which are incident only with an unchanged segment on the current row to the current row with the same offset and colour;
  parsing changed segments in the current row to identify pixel runs;
  processing the identified pixel runs dependent upon unextended edges of the preceding row;
  repeating the partitioning, extending, parsing and processing steps for all rows of the tile; and
  outputting the edges.

According to another aspect of the disclosed invention, there is provided a system for transcoding a delta row encoded image, the system comprising:
  a computer and a printer comprising one or more processors and one or more non-transitory tangible storage devices storing computer executable software programs for implementing a method comprising the steps of:

receiving the delta row encoded image comprising terms each comprising an offset and replacement bytes for each changed portion to the exclusion of storing unchanged portions;

subdividing the delta row encoded image into a plurality of delta row encoded tiles based on predetermined tile boundaries;

determining, for a row of the delta row encoded image, terms comprising a tile offset and replacement bytes for each changed portion within a delta row encoded tile using the predetermined tile boundaries, stored offsets and replacement bytes, the tile offsets and the replacement bytes being determined to allow for independent processing of the differentially encoded tiles;

determining edges within each of the delta row encoded tiles based on the determined tile offsets, bypassing an edge detection process for unchanged portions of the differentially encoded tile; and transcoding the delta row encoded image by encoding the identified edges.

According to another aspect of the disclosed invention, there is provided a system for transcoding a delta row encoded image, the system comprising:

a computer and a printer comprising one or more processors and one or more non-transitory tangible storage devices storing computer executable software programs for implementing a method comprising the steps of:

receiving a delta row encoded tile comprising terms each comprising an offset and replacement bytes for each changed portion to the exclusion of storing unchanged portions;

parsing a first row of the tile, provided as explicit pixels, to identify pixel runs for the first row;

generating depending upon the identified pixel runs edges for the first row of the tile;

partitioning a subsequent current row into changed and unchanged segments depending upon an offset and a length of each term;

extending edges on the preceding row which are incident only with an unchanged segment on the current row to the current row with the same offset and colour;

parsing changed segments in the current row to identify pixel runs;

processing the identified pixel runs dependent upon unextended edges of the preceding row;

repeating the partitioning, extending, parsing and processing steps for all rows of the tile; and outputting the edges.

According to another aspect of the disclosed invention, there is provided one or more computer readable non-transitory tangible storage devices storing computer executable software programs for directing one or more processors to implementing a method for transcoding a delta row encoded image, the programs comprising:

computer executable code for receiving the delta row encoded image comprising terms each comprising an offset and replacement bytes for each changed portion to the exclusion of storing unchanged portions;

computer executable code for subdividing the delta row encoded image into a plurality of delta row encoded tiles based on predetermined tile boundaries;

computer executable code for determining, for a row of the delta row encoded image, terms comprising a tile offset and replacement bytes for each changed portion within a delta row encoded tile using the predetermined tile boundaries, stored offsets and replacement bytes, the tile offsets and the replacement bytes being determined to allow for independent processing of the differentially encoded tiles;

computer executable code for determining edges within each of the delta row encoded tiles based on the determined tile offsets, bypassing an edge detection process for unchanged portions of the differentially encoded tile; and computer executable code for transcoding the delta row encoded image by encoding the identified edges.

According to another aspect of the disclosed invention, there is provided one or more computer readable non-transitory tangible storage devices storing computer executable software programs for directing one or more processors to implementing a method for transcoding a delta row encoded image, the programs comprising:

computer executable code for receiving a delta row encoded tile comprising terms each comprising an offset and replacement bytes for each changed portion to the exclusion of storing unchanged portions;

computer executable code for parsing a first row of the tile, provided as explicit pixels, to identify pixel runs for the first row;

computer executable code for generating depending upon the identified pixel runs edges for the first row of the tile;

computer executable code for partitioning a subsequent current row into changed and unchanged segments depending upon an offset and a length of each term;

computer executable code for extending edges on the preceding row which are incident only with an unchanged segment on the current row to the current row with the same offset and colour;

computer executable code for parsing changed segments in the current row to identify pixel runs;

computer executable code for processing the identified pixel runs dependent upon unextended edges of the preceding row;

computer executable code for repeating the partitioning, extending, parsing and processing steps for all rows of the tile; and computer executable code for outputting the edges.

Other aspects of the invention are also disclosed.

BRIEF DESCRIPTION OF THE DRAWINGS

One or more embodiments of the invention will now be described with reference to the following drawings, in which:

FIG. 26 shows an example of DRC term flattening; and

DETAILED DESCRIPTION INCLUDING BEST MODE

Context

Figure 1:
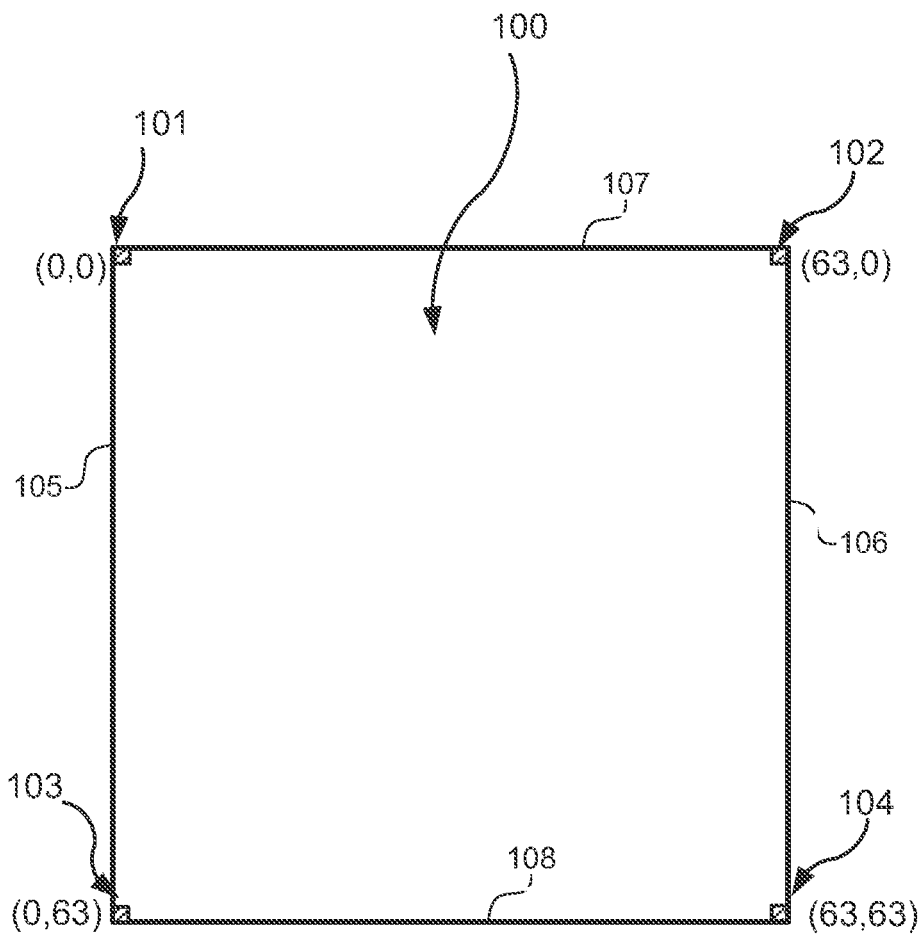
FIG. 1 depicts an image tile.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventor(s) or the patent applicant that such documents or devices in any way form part of the common general knowledge in the art.

The principles of the arrangements described herein have general applicability to image compression. For ease of explanation the arrangements are described with reference to image compression used in a colour raster image processing system. However, it is not intended that the present invention be limited to the described arrangements. For example, the invention may have application to any arrangement utilising compression where the input is a Delta-Row Compression encoded image and the output is edge encoded.

Figure 28A:
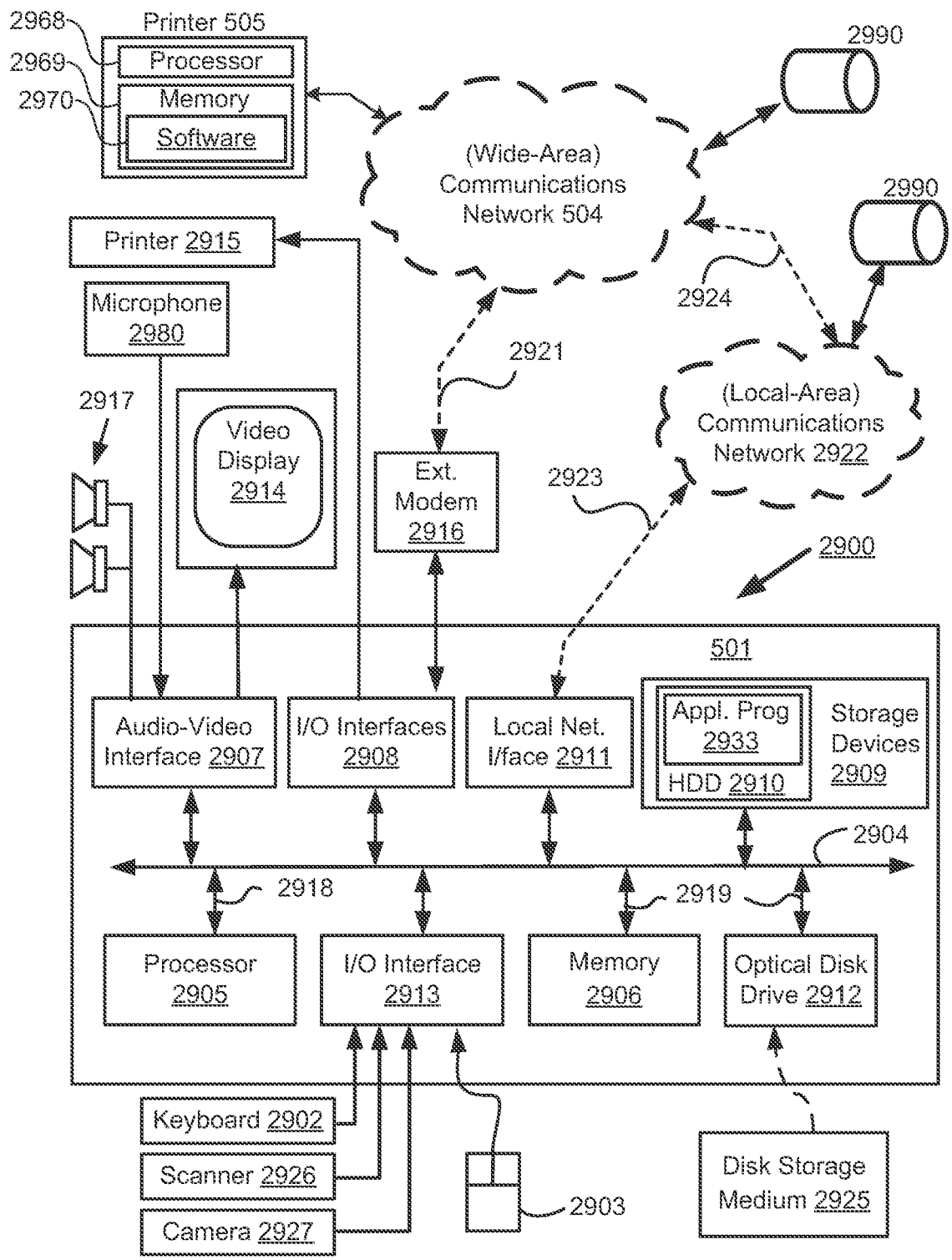
FIGS. 28A and 28B form a schematic block diagram of a general purpose computer system upon which arrangements described can be practiced.
Figure 28B:
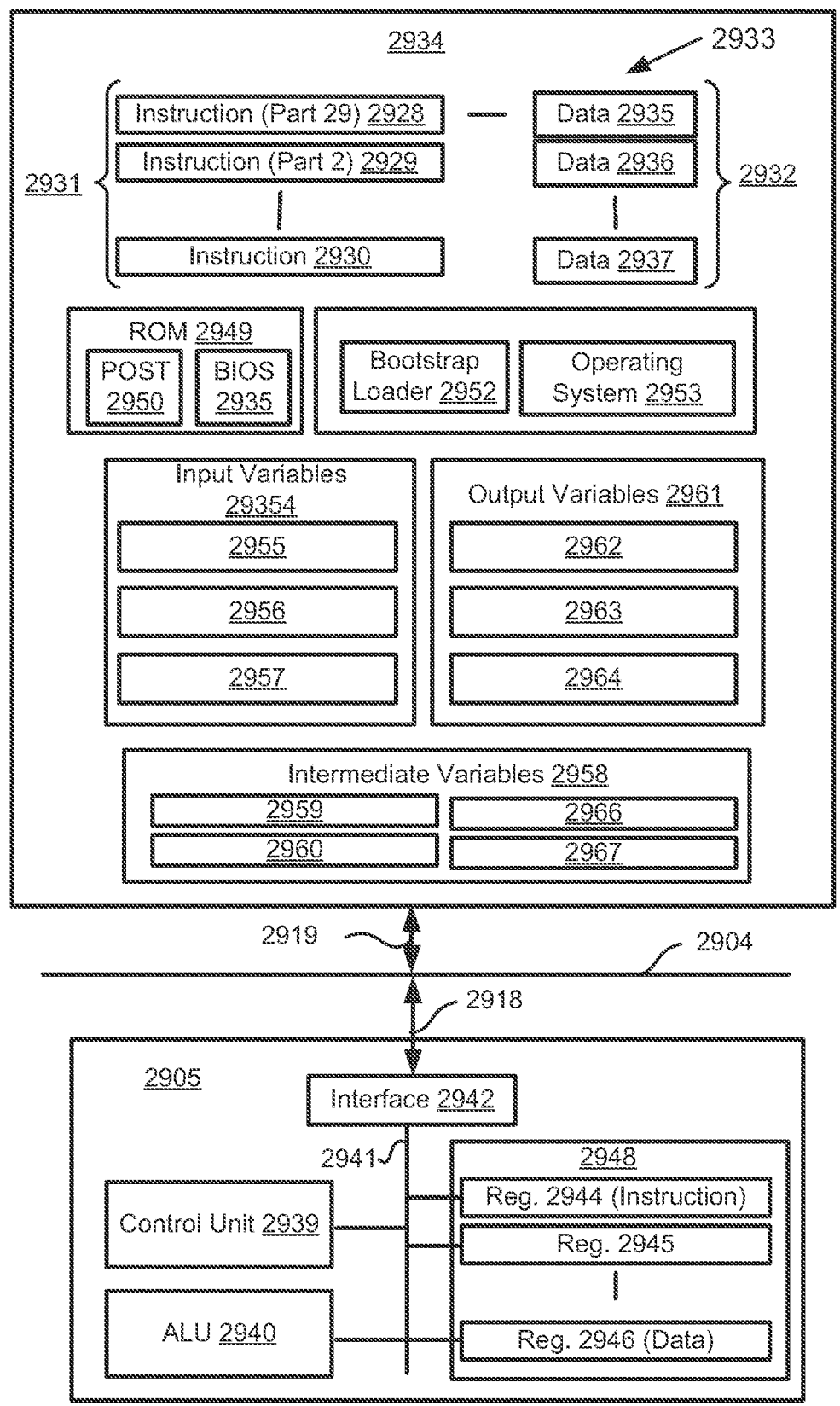

FIGS. 28A and 28B depict a general-purpose computer system 2900, and a networked printer 505 upon which the various arrangements described can be practiced. Although the present description relates to the computer and the networked printer 505 cooperating to effect the disclosed transcoding arrangements, the printer 2915 can equally be used in the described arrangements.

Furthermore, although the present description describes how operation of various process steps are performed by the processors 2905, 2968 as directed by respective software programs 2933, 2970, different distributions of functionality, hardware and software can be used.

Furthermore, although the present description provides a comprehensive description of the computer module 501, a similar description (not provided) applies to the operation of the computer modules in the printer 505.

As seen in FIG. 28A, the computer system 2900 includes: a computer module 501; input devices such as a keyboard 2902, a mouse pointer device 2903, a scanner 2926, a camera 2927, and a microphone 2980; and output devices including a local printer 2915, a display device 2914 and loudspeakers 2917. An external Modulator-Demodulator (Modem) transceiver device 2916 may be used by the computer module 501 for communicating to and from the networked printer 505 over a communications network 504 via a connection 2921. The communications network 504 may be a wide-area network (WAN), such as the Internet, a cellular telecommunications network, or a private WAN. Where the connection 2921 is a telephone line, the modem 2916 may be a traditional "dial-up" modem. Alternatively, where the connection 2921 is a high capacity (e.g., cable) connection, the modem 2916 may be a broadband modem. A wireless modem may also be used for wireless connection to the communications network 504.

The computer module 501 typically includes at least one processor unit 2905, and a memory unit 2906. For example, the memory unit 2906 may have semiconductor random access memory (RAM) and semiconductor read only memory (ROM). The computer module 501 also includes an number of input/output (I/O) interfaces including: an audio-video interface 2907 that couples to the video display 2914, loudspeakers 2917 and microphone 2980; an I/O interface 2913 that couples to the keyboard 2902, mouse 2903, scanner 2926, camera 2927 and optionally a joystick or other human interface device (not illustrated); and an interface 2908 for the external modem 2916 and printer 2915. In some implementations, the modem 2916 may be incorporated within the computer module 501, for example within the interface 2908. The computer module 501 also has a local network interface 2911, which permits coupling of the computer system 2900 via a connection 2923 to a local-area communications network 2922, known as a Local Area Network (LAN). As illustrated in FIG. 28A, the local communications network 2922 may also couple to the wide network 504 via a connection 2924, which would typically include a so-called "firewall" device or device of similar functionality. The local network interface 2911 may comprise an Ethernet circuit card, a Bluetooth® wireless arrangement or an IEEE 802.11 wireless arrangement; however, numerous other types of interfaces may be practiced for the interface 2911.

The I/O interfaces 2908 and 2913 may afford either or both of serial and parallel connectivity, the former typically being implemented according to the Universal Serial Bus (USB) standards and having corresponding USB connectors (not illustrated). Storage devices 2909 are provided and typically include a hard disk drive (HDD) 2910. Other storage devices such as a floppy disk drive and a magnetic tape drive (not illustrated) may also be used. An optical disk drive 2912 is typically provided to act as a non-volatile source of data. Portable memory devices, such optical disks (e.g., CD-ROM, DVD, Blu Ray Disc™), USB-RAM, portable, external hard drives, and floppy disks, for example, may be used as appropriate sources of data to the system 2900.

The components 2905 to 2913 of the computer module 501 typically communicate via an interconnected bus 2904 and in a manner that results in a conventional mode of operation of the computer system 2900 known to those in the relevant art. For example, the processor 2905 is coupled to the system bus 2904 using a connection 2918. Likewise, the memory 2906 and optical disk drive 2912 are coupled to the system bus 2904 by connections 2919. Examples of computers on which the described arrangements can be practised include IBM-PC's and compatibles, Sun Sparcstations, Apple Mac™ or like computer systems.

The transcoding method may be implemented using the computer system 2900 wherein the processes of FIGS. 2, 8-12, 14-15 and 27, to be described, may be implemented as one or more software application programs 2933, 2970 executable within the computer system 2900. In particular, the steps of the transcoding method are effected by instructions 2931 (see FIG. 28B) in the software 2933 (and corresponding instructions in the software 2970 in the printer 505) that are carried out within the computer system 2900. The software instructions 2931 may be formed as one or more code modules, each for performing one or more particular tasks. The software may also be divided into two separate parts, in which a first part and the corresponding code modules performs the transcoding methods and a second part and the corresponding code modules manage a user interface between the first part and the user.

The software may be stored in a computer readable medium, including the storage devices described below, for example. The software is loaded into the computer system 2900 from the computer readable medium, and then executed by the computer system 2900. A computer readable medium having such software or computer program recorded on the computer readable medium is a computer program product. The use of the computer program product in the computer system 2900 preferably effects an advantageous transcoding apparatus.

The software 2933 is typically stored in the HDD 2910 or the memory 2906. The software is loaded into the computer system 2900 from a computer readable medium, and executed by the computer system 2900. Thus, for example, the software 2933 may be stored on an optically readable disk storage medium (e.g., CD-ROM) 2925 that is read by the optical disk drive 2912. A computer readable medium having such software or computer program recorded on it is a computer program product. The use of the computer program product in the computer system 2900 preferably effects an apparatus for performing the disclosed transcoding method.

In some instances, the application programs 2933 may be supplied to the user encoded on one or more CD-ROMs 2925 and read via the corresponding drive 2912, or alternatively may be read by the user from the networks 504 or 2922. Still further, the software can also be loaded into the computer system 2900 from other computer readable media. Computer readable storage media refers to any non-transitory tangible storage medium that provides recorded instructions and/or data to the computer system 2900 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 501. Examples of transitory or non-tangible computer readable transmission media that may also participate in the provision of software, application programs, instructions and/or data to the computer module 501 include radio or infra-red transmission channels as well as a network connection to another computer or networked device, and the Internet or Intranets including e-mail transmissions and information recorded on Websites and the like.

The second part of the application programs 2933 and the corresponding code modules mentioned above may be executed to implement one or more graphical user interfaces (GUIs) to be rendered or otherwise represented upon the display 2914. Through manipulation of typically the keyboard 2902 and the mouse 2903, a user of the computer system 2900 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 2917 and user voice commands input via the microphone 2980.

FIG. 28B is a detailed schematic block diagram of the processor 2905 and a "memory" 2934. The memory 2934 represents a logical aggregation of all the memory modules (including the HDD 2909 and semiconductor memory 2906) that can be accessed by the computer module 501 in FIG. 28A.

When the computer module 501 is initially powered up, a power-on self-test (POST) program 2950 executes. The POST program 2950 is typically stored in a ROM 2949 of the semiconductor memory 2906 of FIG. 28A. A hardware device such as the ROM 2949 storing software is sometimes referred to as firmware. The POST program 2950 examines hardware within the computer module 501 to ensure proper functioning and typically checks the processor 2905, the memory 2934 (2909, 2906), and a basic input-output systems software (BIOS) module 2951, also typically stored in the ROM 2949, for correct operation. Once the POST program 2950 has run successfully, the BIOS 2951 activates the hard disk drive 2910 of FIG. 28A. Activation of the hard disk drive 2910 causes a bootstrap loader program 2952 that is resident on the hard disk drive 2910 to execute via the processor 2905. This loads an operating system 2953 into the RAM memory 2906, upon which the operating system 2953 commences operation. The operating system 2953 is a system level application, executable by the processor 2905, to fulfil various high level functions, including processor management, memory management, device management, storage management, software application interface, and generic user interface.

The operating system 2953 manages the memory 2934 (2909, 2906) to ensure that each process or application running on the computer module 501 has sufficient memory in which to execute without colliding with memory allocated to another process. Furthermore, the different types of memory available in the system 2900 of FIG. 28A must be used properly so that each process can run effectively. Accordingly, the aggregated memory 2934 is not intended to illustrate how particular segments of memory are allocated (unless otherwise stated), but rather to provide a general view of the memory accessible by the computer system 2900 and how such is used.

As shown in FIG. 28B, the processor 2905 includes a number of functional modules including a control unit 2939, an arithmetic logic unit (ALU) 2940, and a local or internal memory 2948, sometimes called a cache memory. The cache memory 2948 typically includes a number of storage registers 2944-2946 in a register section. One or more internal busses 2941 functionally interconnect these functional modules. The processor 2905 typically also has one or more interfaces 2942 for communicating with external devices via the system bus 2904, using a connection 2918. The memory 2934 is coupled to the bus 2904 using a connection 2919.

The application program 2933 includes a sequence of instructions 2931 that may include conditional branch and loop instructions. The program 2933 may also include data 2932 which is used in execution of the program 2933. The instructions 2931 and the data 2932 are stored in memory locations 2928, 2929, 2930 and 2935, 2936, 2937, respectively. Depending upon the relative size of the instructions 2931 and the memory locations 2928-2930, a particular instruction may be stored in a single memory location as depicted by the instruction shown in the memory location 2930. Alternately, an instruction may be segmented into a number of parts each of which is stored in a separate memory location, as depicted by the instruction segments shown in the memory locations 2928 and 2929.

In general, the processor 2905 is given a set of instructions which are executed therein. The processor 2905 waits for a subsequent input, to which the processor 2905 reacts to by executing another set of instructions. Each input may be provided from one or more of a number of sources, including data generated by one or more of the input devices 2902, 2903, data received from an external source across one of the networks 504, 2902, data retrieved from one of the storage devices 2906, 2909 or data retrieved from a storage medium 2925 inserted into the corresponding reader 2912, all depicted in FIG. 28A. The execution of a set of the instructions may in some cases result in output of data. Execution may also involve storing data or variables to the memory 2934.

The disclosed transcoding arrangements use input variables 2954, which are stored in the memory 2934 in corresponding memory locations 2955, 2956, 2957. The transcoding arrangements produce output variables 2961, which are stored in the memory 2934 in corresponding memory locations 2962, 2963, 2964. Intermediate variables 2958 may be stored in memory locations 2959, 2960, 2966 and 2967.

Referring to the processor 2905 of FIG. 28B, the registers 2944, 2945, 2946, the arithmetic logic unit (ALU) 2940, and the control unit 2939 work together to perform sequences of micro-operations needed to perform "fetch, decode, and execute" cycles for every instruction in the instruction set making up the program 2933. Each fetch, decode, and execute cycle comprises:
 a fetch operation, which fetches or reads an instruction 2931 from a memory location 2928, 2929, 2930;
 a decode operation in which the control unit 2939 determines which instruction has been fetched; and
 an execute operation in which the control unit 2939 and/or the ALU 2940 execute the instruction.

Thereafter, a further fetch, decode, and execute cycle for the next instruction may be executed. Similarly, a store cycle may be performed by which the control unit 2939 stores or writes a value to a memory location 2932.

Each step or sub-process in the processes of FIGS. 2, 8-12, 14-15 and 27 is associated with one or more segments of the program 2933 and is performed by the register section 2944, 2945, 2947, the ALU 2940, and the control unit 2939 in the processor 2905 working together to perform the fetch, decode, and execute cycles for every instruction in the instruction set for the noted segments of the program 2933.

The transcoding method may alternatively be implemented in dedicated hardware such as one or more integrated circuits performing the transcoding functions or sub functions. Such dedicated hardware may include graphic processors, digital signal processors, or one or more microprocessors and associated memories.

Image Tiles

An image can be stored as a set of image tiles, where an image tile refers to a block of N by M pixels. There are typically multiple blocks across the width of an image and multiple blocks down the length of the image. Tiles are disjoint and cover the image. The position of a pixel (X,Y), where X, Y are integers, within a tile is relative to the upper left hand corner of the tile. Y indexes the tile rows whereas X indexes the offset of a pixel along a tile row. A tile row consists of the set of pixels that span the width of the tile.

Raster order processing of a tile refers to processing the tile pixel by pixel, tile row by tile row, in sequential order, starting with the first tile row and ending with the last row. Pixel values P[X, Y], within a tile refer to the colour value of pixel P, located at a position (X, Y). Where the dimensions of an image do not contain an integer number of tiles the image is preferably padded to the requisite size. Typically tiles are processed one by one, though they may also be processed in parallel. For example, FIG. 1 shows a tile 100 containing 64×64 pixels where a first pixel 101 in a first tile row occupies a pixel position (0, 0) and a last pixel 102 in first tile row occupies a pixel position (63, 0). Accordingly, a first pixel 103 in a last tile row occupies a position (0, 63) and a last pixel 104 in a last tile row occupies a position (63, 63). The tile 100 is delineated by predetermined tile boundaries 105-108 established by the locations of the pixels 101-104, and an image is subdivided into tiles according to these boundaries.

Edge Based Compressor

An edge-based compressor typically parses pixels of an image or tile in raster order, identifying, on each scanline, groups of consecutive pixels with identical colours. Each group of consecutive pixels with identical colours is referred to as a pixel run. A pair of edges defines a start and an end of each pixel run. Where possible, edges are joined across scanlines, and the resulting set of edges for an image or tile can be compressed to form an encoded lossless representation of that image or tile.

Edge Generation

An edge generator uses pixel runs to generate regions, within an image or a tile, of connected pixel runs that have identical colour values. Edges mark out the boundaries between neighbouring regions. Each region requires a pair of edges to fully describe its boundary. The pair of edges typically comprises an 'enabling' edge which describes the left hand side of a region, and a 'disabling' edge that describes the right hand side of the region. For the purpose of this description the enabling and disabling edges are referred to as an 'edge pair'.

The edge generation process creates edge pairs that link pixel runs of identical colour value to one another forming flat colour regions as described above. New edge pairs, as they are created, are considered to be active until they are precluded from continuing. Edge pairs are extended when a pixel run on a current scanline overlaps an active edge pair and meets the criteria for joining. For a pixel run to join an active edge pair the pixel run must overlap an area that is currently spanned by an active edge pair and have an identical colour value to that associated with the edge pair. As will be described below, it is convenient to consider active edge pairs on a previous scanline when attempting to determine whether or not a pixel run may join any existing active edge pairs. Edge pairs are not permitted to cross other edge pairs. The flat regions that are described by edge pairs within a tile are disjoint. Edge pairs can be precluded from continuing in one of two ways as follows:

a pixel run on the next tile scanline spans across an active edge pair in such a way that the active edge is precluded from continuing, or the last scanline in the tile is processed and the tile ends.

In either of the above events the edge is prevented from continuing, it is considered 'resolved' and flagged as inactive.

Figure 2:
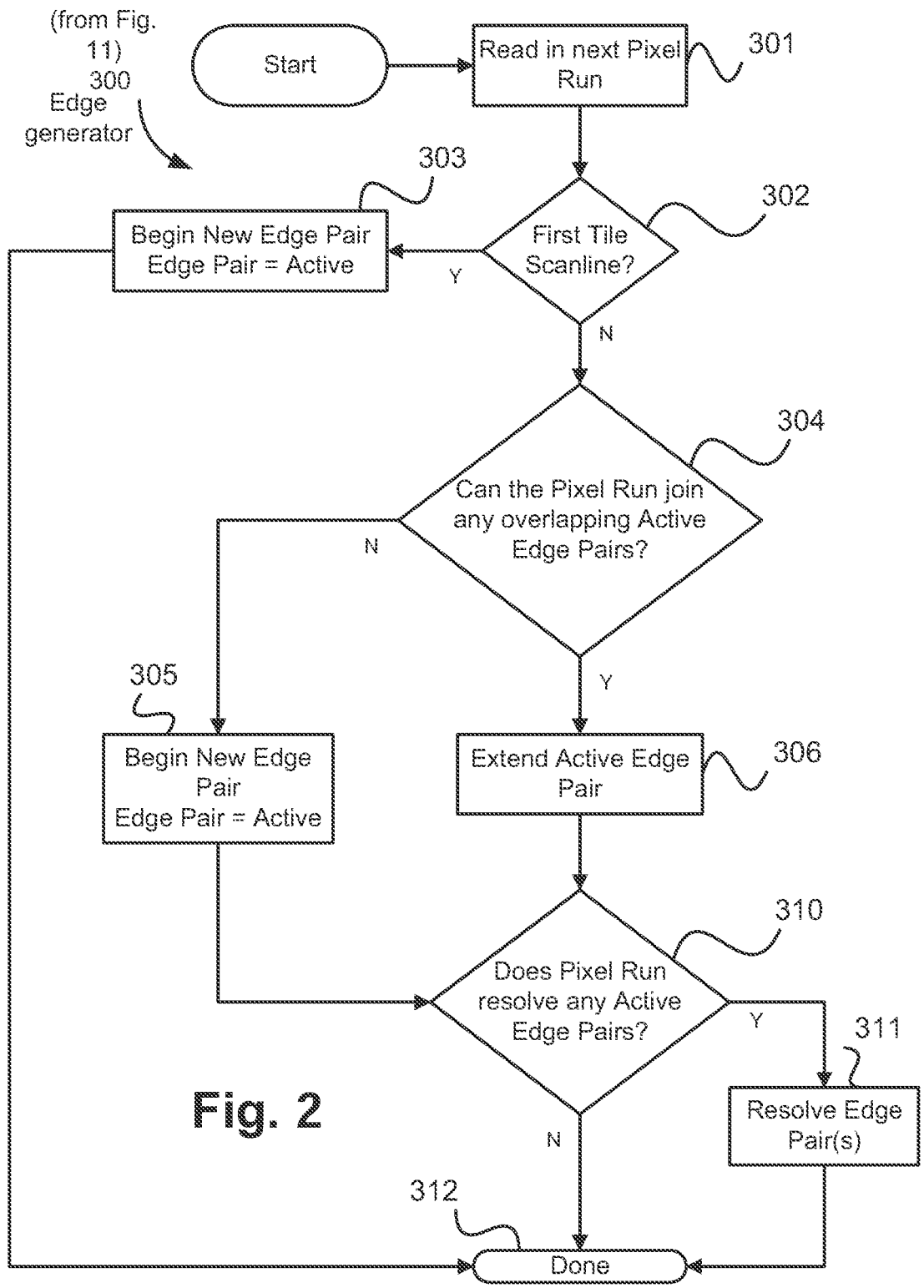
FIG. 2 shows a flow diagram of an edge generation process performed by an Edge Generator.

FIG. 2 shows a flow diagram of an edge generation process 300 performed by an Edge Generator, performed by the processors 2905, 2968 as directed by respective software programs 2933, 2970. The Edge Generator 300 iterates the pixel runs for a scanline, and based on the relationships between each pixel run and edges from the previous scanlines it will extend or terminate those edges. It may also start new edges. The Edge Generator 300 executes the process 300 until the entire tile has been processed. The process 300 starts with a read-pix-run step 301, performed by the processors 2905, 2968 as directed by respective software programs 2933, 2970, in which a next available pixel run is read. If it is determined in a following check-first-line step 302, performed by the processors 2905, 2968 as directed by respective software programs 2933, 2970, that the pixel run occurs on the first scanline of a tile, the process 300 proceeds according to a Y arrow to a begin-edge step 303, performed by the processors 2905, 2968 as directed by respective software programs 2933, 2970, in which a new edge pair is created. This edge pair is set to an active state by the step 303. Following the begin-edge step 303, the process 300 ends at an exit-generate step 312, performed by the processors 2905, 2968 as directed by respective software programs 2933, 2970.

Alternatively, if it is determined in the check-first-line step 302 that the pixel run occurs on a subsequent tile row, then the process 300 follows a N arrow and the pixel run is examined in a following check-connectedness step 304, performed by the processors 2905, 2968 as directed by respective software programs 2933, 2970, to determine whether or not the pixel run can join any existing active edge pairs. If it is determined that the pixel run cannot join any of the existing active edge pairs the Edge Generator process 300 follows a N arrow and proceeds to a start-edge step 305, performed by the processors 2905, 2968 as directed by respective software programs 2933, 2970, in which a new edge pair is created and set to active, after which the process 300 proceeds to a following check-resolve step 310, performed by the processors 2905, 2968 as directed by respective software programs 2933, 2970. Alternatively, if it is determined in the check-connectedness step 304 that the pixel run can join an overlapping active edge pair, then the Edge Generator process 300 follows a Y arrow and proceeds to an extend-edge step 306, performed by the processors 2905, 2968 as directed by respective software programs 2933, 2970, in which the active edge pair is extended to encompass that pixel run. Following the extend-edge step 306 the Edge Generator process 300 proceeds to the check-resolve step 310.

In the check-resolve step 310, performed by the processors 2905, 2968 as directed by respective software programs 2933, 2970, it is determined whether the pixel run extends past other active edge pairs within the tile thereby precluding them from continuing. If this is the case then the process 300 follows a Y arrow and the edge pairs so affected are 'resolved' i.e. set as inactive in a following resolve-edge step 311, performed by the processors 2905, 2968 as directed by respective software programs 2933, 2970, before the process 300 ends at the step 312, performed by the processors 2905, 2968 as directed by respective software programs 2933, 2970. Alternatively, if the pixel run does not resolve any active edge pairs then the process 300 follows an N arrow and the process 300 ends at the exit-generate step 312.

For the purposes of this description, edge pairs generated by the Edge Generator 300 are ordered in increasing y then increasing x direction by the starting position of the enabling edge.

Delta Row Image Compression

Delta-Row Compression (DRC) is an image compression method which encodes an image row-by-row. For each row, other than the first row of an image, the method encodes only the pixel differences between that row, referred to as a current row, and a preceding row, referred to as the seed row.

The first row of the image is encoded by the values of the pixels in that row. Pixels are deemed to be different if they do not have identical colour values. A current row is viewed as a set of segments (also referred to as pixel segments or row segments, where the segments are disjoint, each segment containing one or more pixels, and the combination of the segments comprises the current row. A pixel segment can contain one or more pixel runs, where each pixel run is made up of consecutive pixels with identical colours. Each segment contains only pixels in the current row which are different to those at the same X-offset in the seed row, or only pixels in the current row which are identical to those at the same X-offset in the seed row. A segment which contains only pixels which are different to those on the seed row is called a "changed segment" (where the pixels in the changed segment have a set of respective pixel values referred to as "replacement bytes", while a segment which contains only pixels which are not different to those on the seed row is called an "unchanged segment" (or an unchanged portion). Changed segments, and/or sets of changed segments can be referred to as changed portions of the image in question. Delta-Row Compression encodes each of the changed segments as a changed segment term which comprises an offset, a length and the pixel values that represent the pixels in the changed segment. For the first changed segment in a row the offset in the changed segment term is the X-offset of the first pixel in the changed segment from the start of the row. For subsequent changed segments in the row the offset of the first pixel in the changed segment is the X-offset from the last pixel in the preceding changed segment.

The length in the changed segment term is the number of pixels in the changed segment. When encoded, the set of changed segment terms for each row is preceded by a header value which (a) identifies them as changed segment terms, and (b) specifies a count of changed segments on the row in question. The first row of the image is encoded as a first row term which comprises a length and then pixel values. The length in the first row term specifies the number of pixels in the first row, and the pixel values in the first row term are those of the pixels in the first row. When encoded, the first row term is preceded by a header value which identifies the following term as a first row term. The combination of the encoded first row with the DRC encoding of the remaining rows in the image comprises the Delta-Row Compressed encoding of that image.

Figure 3:
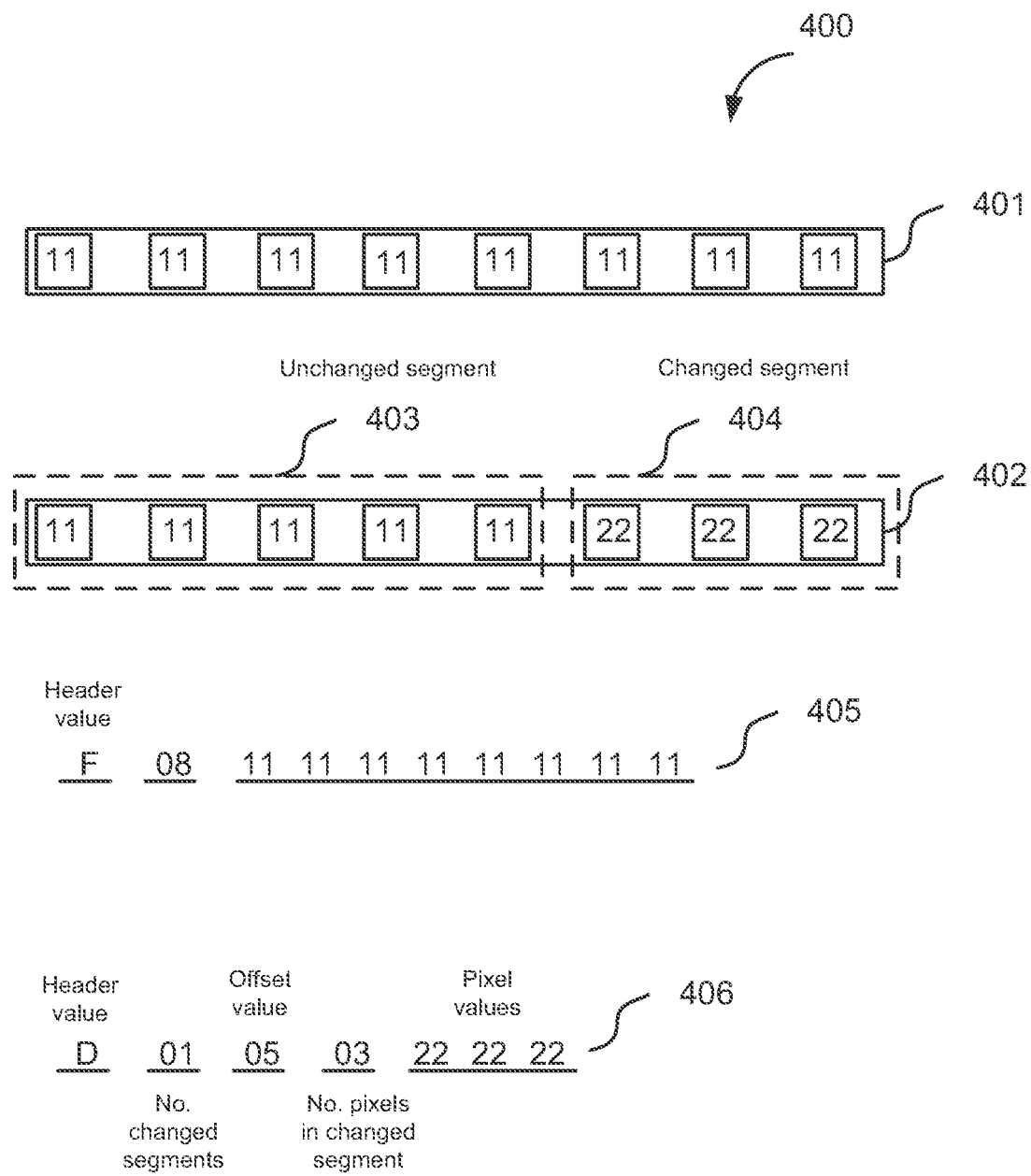
FIG. 3 shows an example of Delta-Row encoded image data.

FIG. 3 shows an example of Delta-Row encoded image data. FIG. 3 shows the first two rows of an 8×8 delta row encoded tile 400 with pixel colours denoted using integer values. A first row 401 contains 8 pixels all of a colour '11'. A second row 402 contains 5 pixels of the colour '11' and 3 pixels of a colour '22'.

The first row 401 is encoded, as depicted by a reference numeral 405, starting with a header value 'F' denoting that it is the first row, followed by the number of pixels "8", and then the 8 pixels values.

The second row 402 is then used as the current row which is compared to the first row 401 which is the seed row. The result of that comparison is that the current row 402 is considered as 2 segments. A first segment 403 is an unchanged segment of 5 pixels. A second segment 404 is a changed segment of 3 pixels.

As seen at a reference numeral 406 only the changed segment 404 is encoded. The current row 402 is hence encoded at 406 as a header value 'D', denoting the following elements as being changed segment terms, followed by the number of changed segments in the row '01', and then followed by the change segment term for the single changed segment which has the offset value '5' of the first pixel in that changed segment 404 from the start of the current row 402, then the number of pixels '3' in the changed segment, and then the 3 pixel values.

Figure 4:
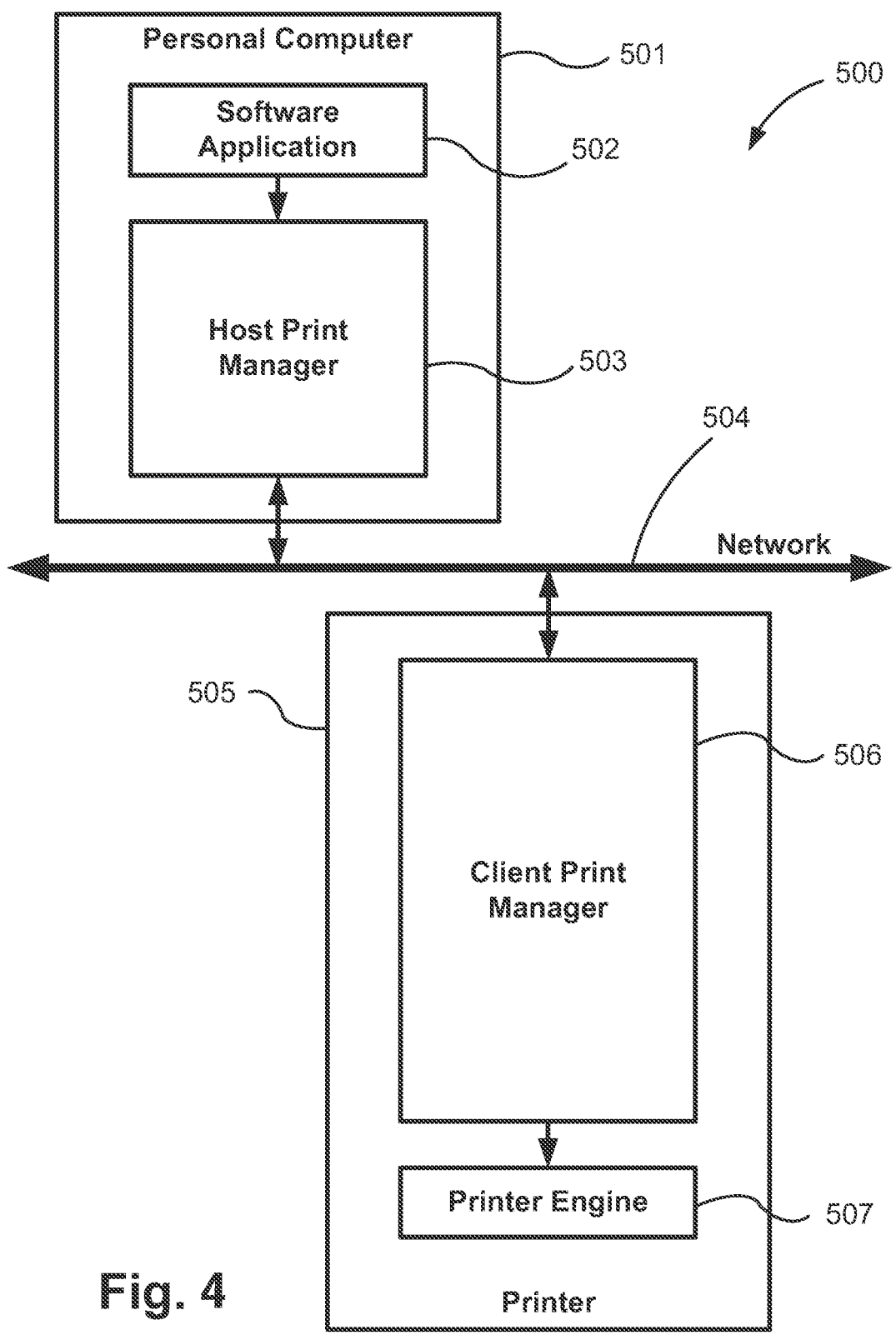
FIG. 4 shows a schematic block diagram of a printing system for rendering and printing a document.

FIG. 4 shows a schematic block diagram of a printing system 500 for rendering and printing a document. The system 500 which includes a Personal Computer 501 connected to a Printer 505 through a Network 504. The Personal Computer 501 and the Printer 505 each include at least one processor unit (2905, 2968 respectively), a memory unit (2906, 2969 respectively), and a Modulator-Demodulator (Modem) transceiver device for communicating to and from the Network 504. The Printer 505 further includes a Printer Engine 507. The Network 504 may be any connection, including a Universal Serial Port (USB) or parallel port connection or a Wide Area Network.

When a user of the Personal Computer 501 chooses to print a document to a physical medium using the Printer 505, there are a number of well-accepted stages in the process. Firstly, a Software Application 502 executing on the Personal Computer 501 generates data in the form of a page description language (PDL), such as Adobe® PostScript® or Hewlett-Packard's Printer Command Language (PCL), which describes objects to be printed. Secondly, a Host Print Manager 503 also executing on the Personal Computer 503 processes the PDL, before transmitting the resulting data from the Personal Computer 501 via the Network 504 to the Printer 505.

A Client Print Manager 506 in the Printer 505 performs further processing before the resulting data is provided to the Printer Engine 507 of the printer 505 where the resulting data is printed on a physical medium.

In one disclosed arrangement, the host print manager 503 and the client print manager 506 are implemented, completely or partially, as the entirety or as part of software applications 2933 and 2970 respectively.

The work done by the Host Print Manager 503 and the Client Print Manager 506 usually consists of job generation, raster image processing (RIP), RIP output compression, RIP output decompression and post RIP processing. These tasks can be split between the Host Print Manager 503 and the Client Print Manager 506 in a number of different ways, depending on the type of architecture chosen.

The RIP is responsible for combining levels and objects that can exist in a typical print job into a 2-dimensional rasterised output. This output must be capable of defining the colour value for each pixel of the page area at the chosen resolution. Due to the real-time requirements of a laser printer engine, the entire page in raster form is usually available for printing once Post RIP Processing starts.

Post RIP Processing is the process of taking the rendered data, performing any final processing needed and feeding the data in real-time to the Printer Engine 507. If all stages of the print process could guarantee real-time supply of data, then a simple, single pass system could operate, where data is pipelined through the system at constant speed just in time for printing. However, raster image processors do not always operate in real time due to the varying complexity of source data used for rendering.

In a typical laser print engine, post RIP processing must operate in real time as the page is fed through the Printer 505, otherwise the Printer Engine 507 will stall and the entire page will need to be printed again. In order to guarantee supply of data in real-time, an entire page of RIP output must be buffered. The memory required to buffer an entire page of raw pixel data is cost-prohibitive. Therefore, RIP Output Compression is necessary to achieve adequate performance at a low cost. The decompression of the RIP output must also be performed in real time.

The delegation of tasks to either the Host Print Manager 503 or the Client Print Manager 506 depends on the type of architecture chosen. The two common architectures are client-based and host-based.

Figure 5:
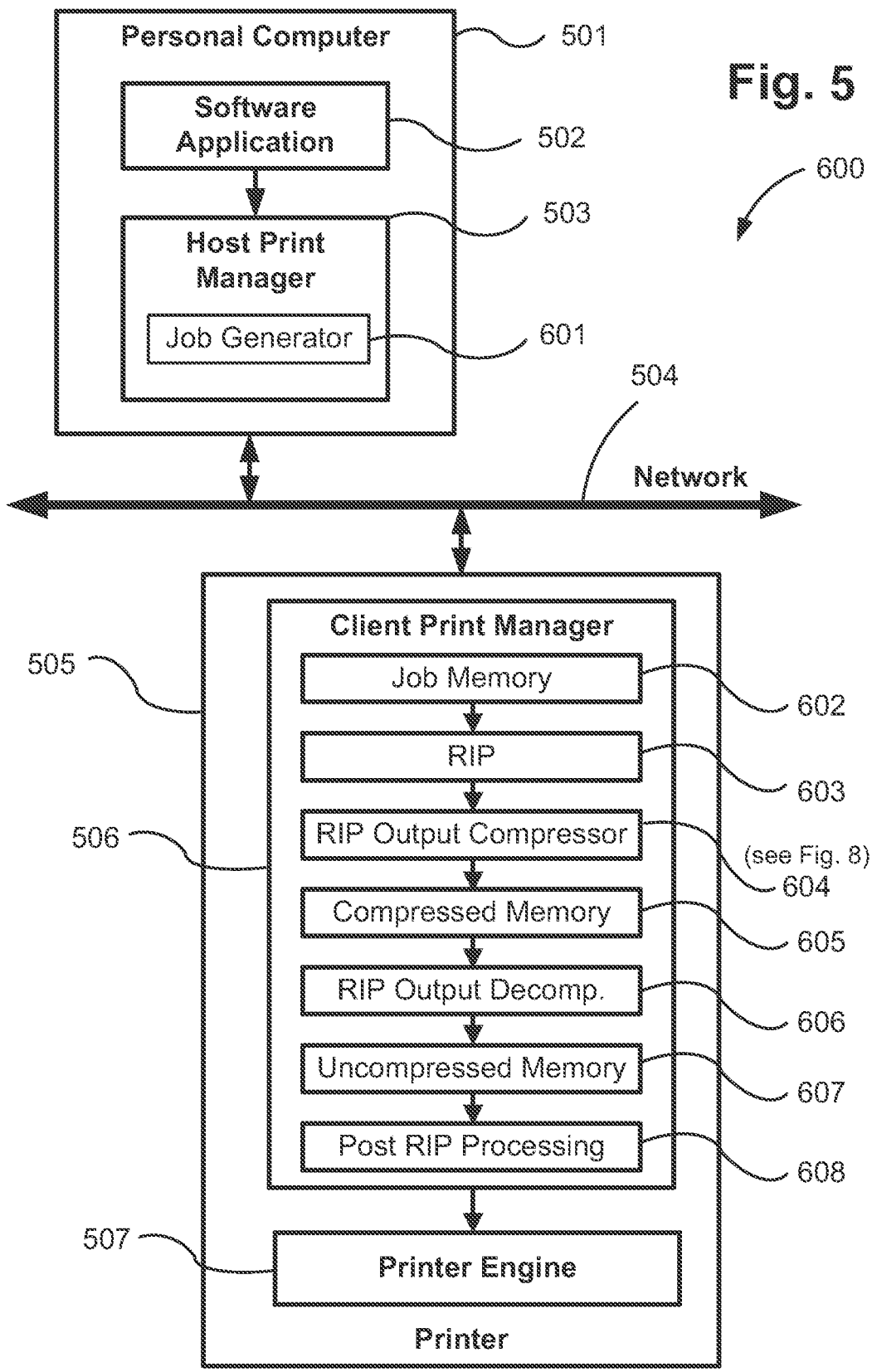
FIG. 5 shows a schematic block diagram of the printing system of FIG. 4 having a client-based architecture.

FIG. 5 shows a schematic block diagram of the printing system of FIG. 4 having a client-based architecture 600. In this arrangement a majority of the processing is performed by the Client Print Manager 506. The user of the Personal Computer 501 chooses to print a document, causing the Software Application 502 to create a PDL, which is sent to the Host Print Manager 503. A Job Generator 601 within the Host Print Manager 503 takes the PDL and organizes it into a format that can be supplied to a RIP 603 in the Client Print Manager 506. From the Job Generator 601 the data is sent over the Network 504 to the Printer 505 which stores the data in a Job Memory 602 of the Client Print Manager 506. The data is then rendered by a RIP 603 to create a bitmap of pixels called the RIP Output. The RIP output is then compressed by a RIP Output Compressor 604 and stored in a Compressed Memory 605. Before the Printer Engine 507 requires the information, the data is decompressed by a RIP Output Decompressor 606 and stored in an Uncompressed Memory 607. This data is modified in a number of ways to optimize the print quality on the Print Engine 507 by a Post Rip Processor 608. Finally, the pixel data is supplied to the Print Engine 507.

Figure 6:
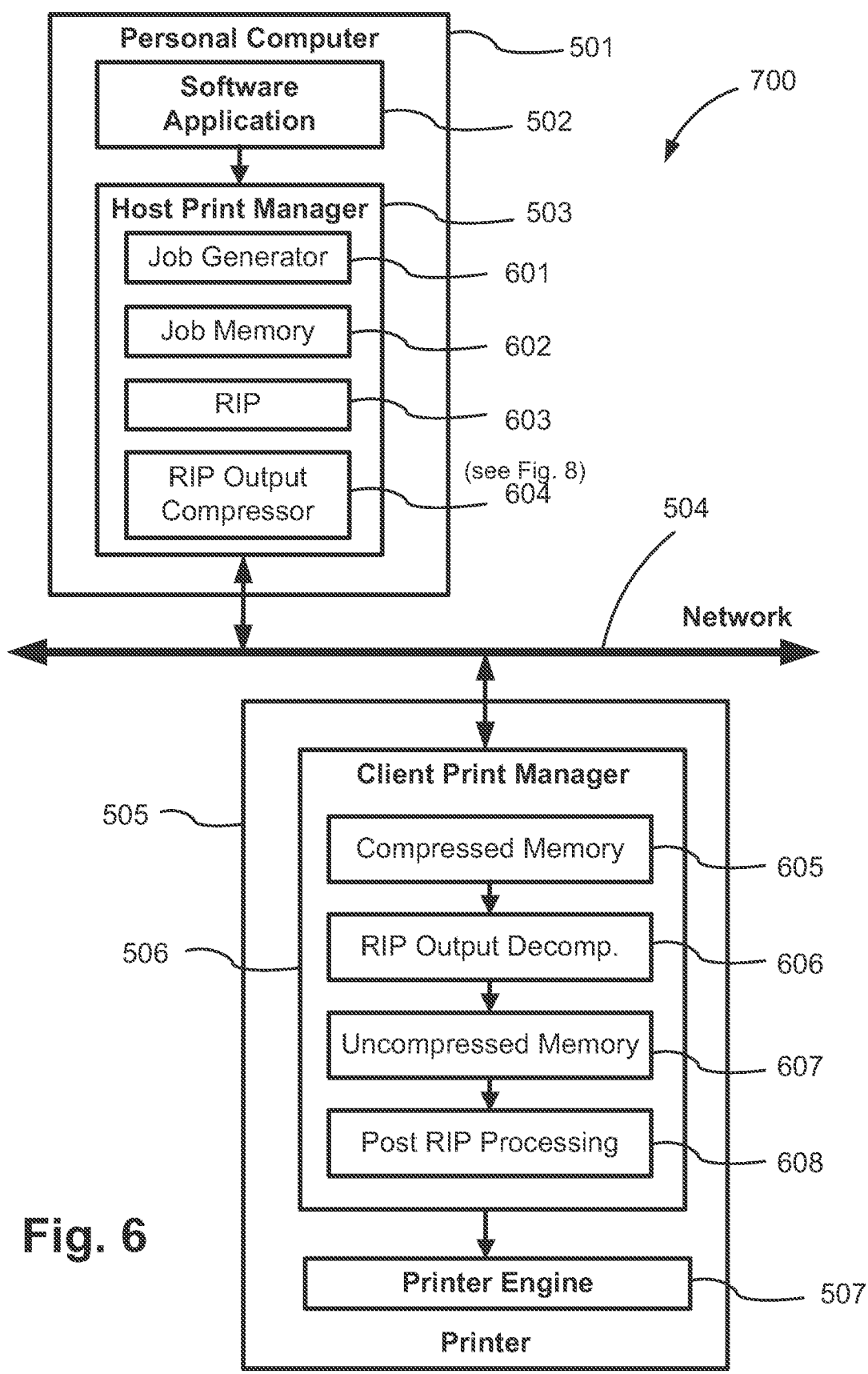
FIG. 6 shows a schematic block diagram of the printing system of FIG. 4 having a host-based architecture.

FIG. 6 shows a schematic block diagram of a host-based architecture 700 of the printing system of FIG. 4. In this arrangement a large proportion of the processing has been shifted into the Host Print Manager 503. The user of the Personal Computer 501 chooses to print the document, causing the Software Application 502 to create a PDL which is sent to the Host Print Manager 503. The Job Generator 601 processes the PDL and organizes it into a format that can be supplied to the RIP 603. This data is stored in the Job Memory 602 before being rendered by the RIP 603 to create a bitmap of pixels called the RIP Output. The RIP Output is compressed by the RIP Output Compressor 604 and sent over the Network 504 to the Client Print Manager 506 in the Printer 505 to be stored in the Compressed Memory 605. Before the Printer Engine 507 requires the information, the data is decompressed by the RIP Output Decompressor 606 and stored in the Uncompressed Memory 607. From there, the Post RIP Processor 608 modifies the data in a number of ways to optimize the print quality on the Print Engine 507. Finally, the pixel data is sent to the Print Engine 507.

The disclosed arrangements include a compression algorithm for compressing rasterised delta-row compressed image data in a single pass using a lossless edge-compression algorithm in a tile-by-tile order.

Overview of the Transcoding Arrangements

The disclosed arrangements remove the need to completely decode a DRC encoded image before generating edges, by using the unchanged segments between DRC encoded rows to optimise that edge generation. The disclosed arrangements only require the changed segments of each DRC row to be parsed for pixel runs and the resulting edges.

Figure 27:
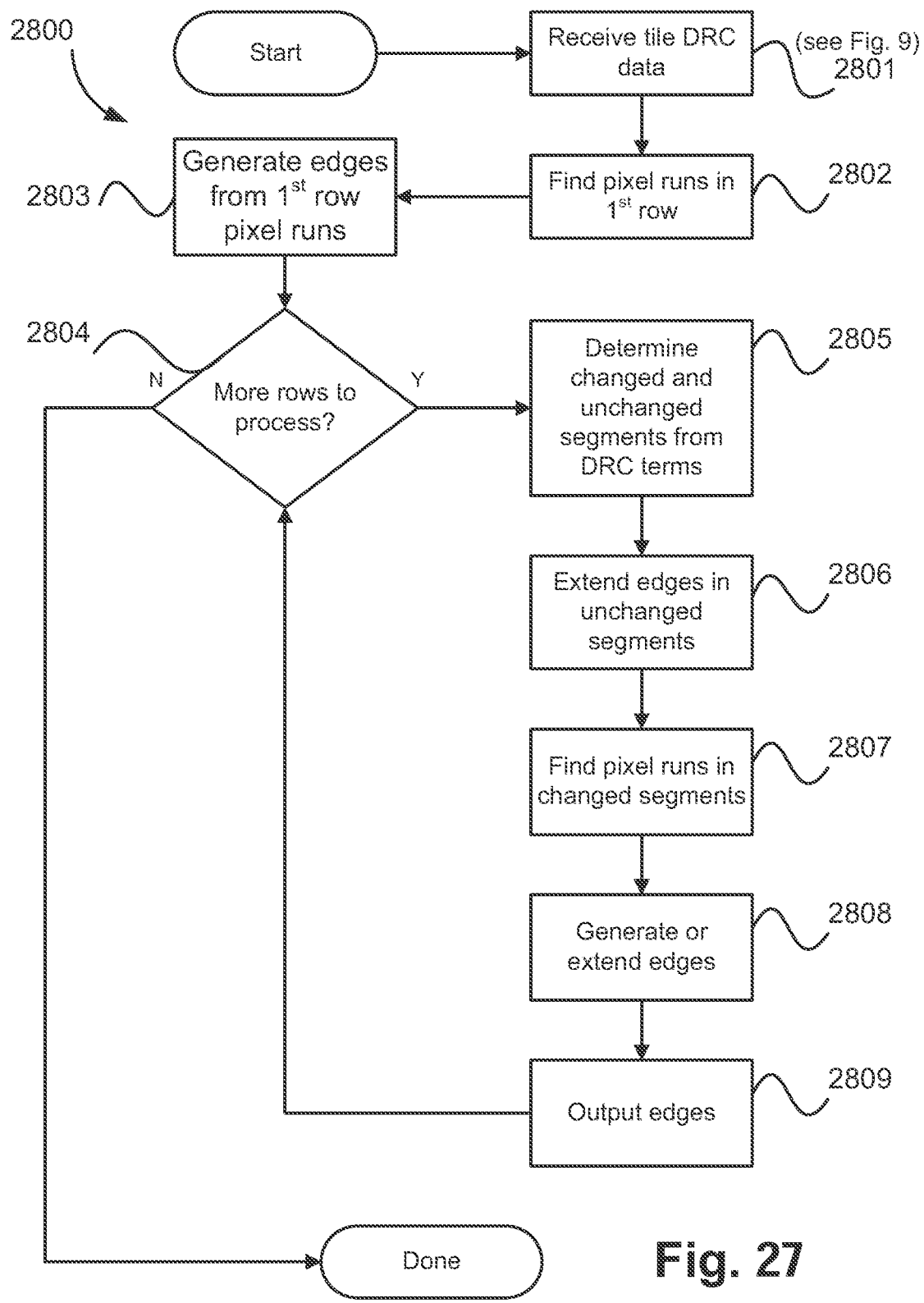
FIG. 27 shows a flow diagram of a process for transcoding tile relative DRC terms to edges.

FIG. 27 shows a schematic flow diagram of a process 2800 for converting the DRC compressed data for a tile into edges, without decompressing that data. The DRC compressed data for the tile is received in a step 2801, performed by the processors 2905, 2968 as directed by respective software programs 2933, 2970, as a sequence of DRC terms. The first row of the tile in that DRC data is provided as explicit pixels, and this row is parsed in a step 2802, performed by the processors 2905, 2968 as directed by respective software programs 2933, 2970, to find pixel runs for the first row. From these pixel runs the edges are generated in a step 2803, performed by the processors 2905, 2968 as directed by respective software programs 2933, 2970, for the first row of the tile.

The DRC compressed data for subsequent rows of the tile is provided as a set of DRC terms for each row. For the remaining rows of the tile, as iterated commencing with a decision step 2804, performed by the processors 2905, 2968 as directed by respective software programs 2933, 2970, the next row is selected as the current row, and the DRC terms for that row are used to partition, in a step 2805, performed by the processors 2905, 2968 as directed by respective software programs 2933, 2970, the current row into changed and unchanged segments. The starting offset and length of each DRC term is used to determine the regions of the current row which will be changed from the previous row, called the seed row. The regions found are the changed segments. Once all DRC terms for the current row have been considered, the unchanged segments are the remaining regions of the current row which are not part of a changed segment. As pixels in an unchanged segment are known to be identical to the pixels at the corresponding x-offsets on the seed row, this allows any edges on the seed row which are incident only with an unchanged segment on the current row to be extended, in a step 2806, performed by the processors 2905, 2968 as directed by respective software programs 2933, 2970, to the current row with the same x-offset and colour. The step 2806 is performed bypassing any edge detection process.

An edge is referred to as being "incident" with a pixel run if the leading extremity of the edge is next to a corner of a pixel at the start or end of the run or within the run.

The changed segments are parsed, in a step 2807, performed by the processors 2905, 2968 as directed by respective software programs 2933, 2970, to find pixel runs. Then in a following step 2808, performed by the processors 2905, 2968 as directed by respective software programs 2933, 2970, those pixels runs together with un-extended edges from the seed row are considered in order to either extend the seed row edges, or to terminate the seed row edges and generate new edges on the current row. Once the edges for the current row have been produced, they are output, in a step 2809, performed by the processors 2905, 2968 as directed by respective software programs 2933, 2970, as the edge compressed data for that row of the tile. Once the DRC data has been process for all rows of the tile, the DRC to edge transcoding is complete for the tile.

Embodiment 1

Figure 7:
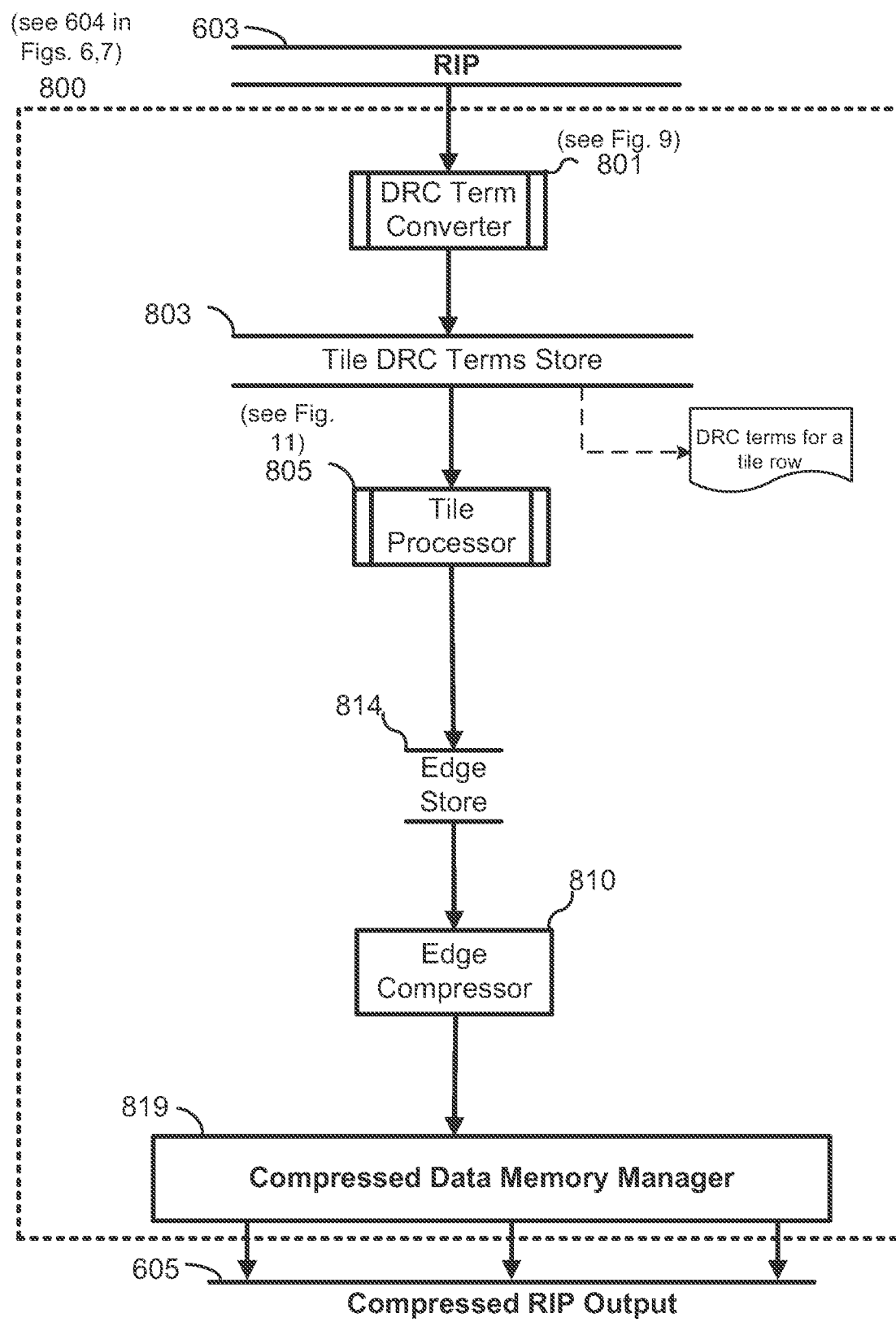
FIG. 7 shows a schematic block diagram for an image compression apparatus as used in the systems of FIGS. 5 and 6.

FIG. 7 shows a schematic block diagram for an image compression apparatus 800 as used in the systems of FIGS. 5 and 6 according to the disclosed arrangements. FIG. 7 shows a schematic block diagram of a preferred embodiment of the RIP Output Compressor 604 which is an Image Compressor 800. The Image Compressor 800 comprises a DRC Term Converter 801, performed by the processors 2905, 2968 as directed by respective software programs 2933, 2970, a Tile Processor 805, performed by the processors 2905, 2968 as directed by respective software programs 2933, 2970, an Edge Compressor 810 and a Compressed Data Memory Manager 819.

Conversion of Image DRC Terms to Tile DRC Terms

The DRC Term Converter 801, performed by the processors 2905, 2968 as directed by respective software programs 2933, 2970, receives input from a job memory buffer (not shown) located in the RIP 603, the buffer containing the DRC data of an image arranged in row raster order. The DRC Term Converter 801 converts the DRC terms for each row into tile-relative DRC terms, described hereinafter in more detail with reference to FIG. 9, which are saved in the Tile DRC Terms Store 803. The terms for each tile are then processed to produce edges by the Tile Processor 805, performed by the processors 2905, 2968 as directed by respective software programs 2933, 2970, for each tile, described hereinafter in more detail with reference to FIG. 10, and the resulting edges are saved in the Edge Store 814. The Edge Compressor 810 compresses the edge data from the Edge Store 814 using a lossless compression method, creating a lossless data bit-stream that is passed to the Compressed Data Memory Manager 819. Where tile processing is to be done in parallel, there is an instance of the Tile Processor 805, Edge Store 814 and Edge Compressor 810 for each tile.

Figure 8:
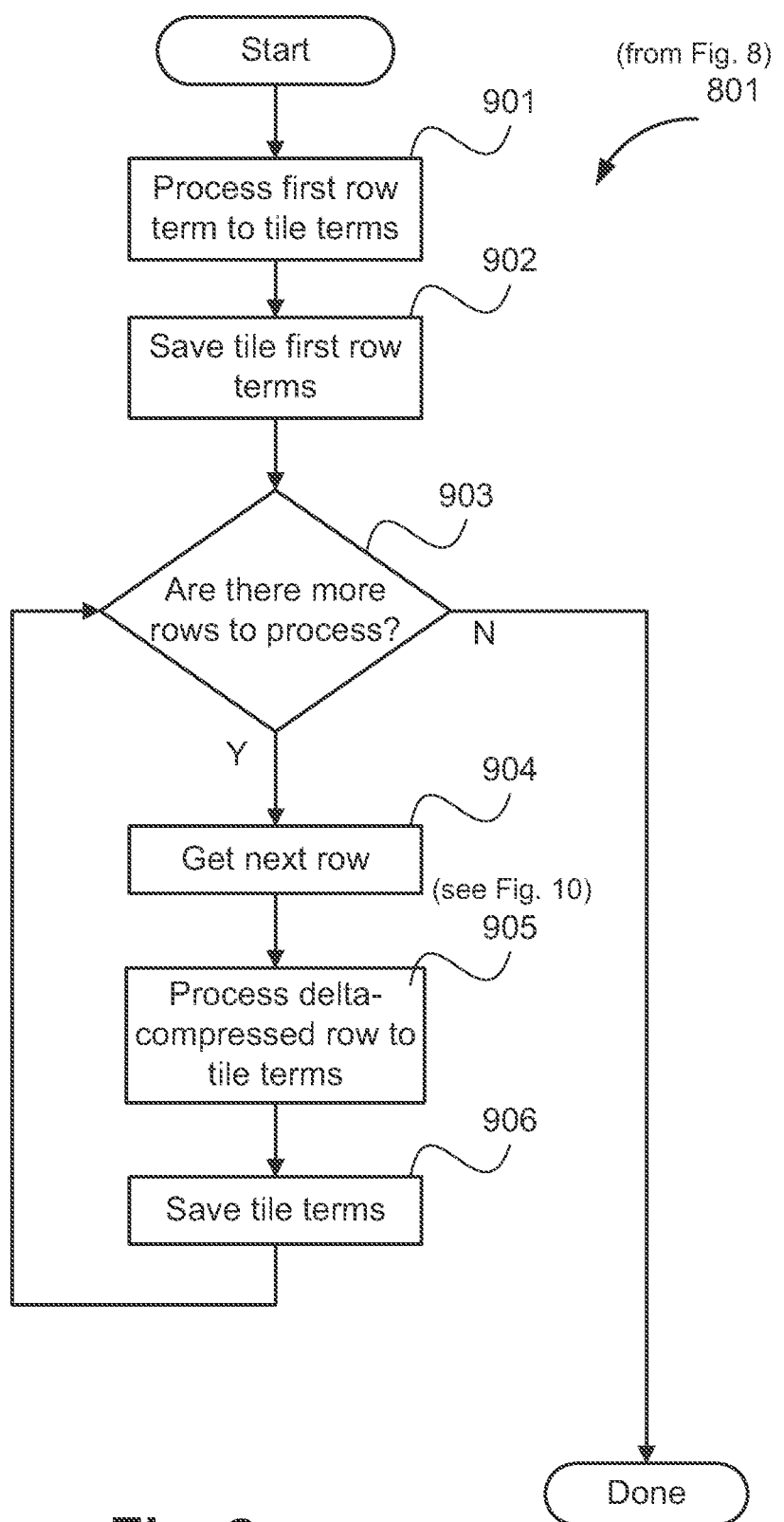
FIG. 8 shows a schematic flow diagram of a DRC Term Converter.

FIG. 8 shows a schematic flow diagram of a process 801 for implementing the DRC Term Converter 801. The input to the process is the encoded rows which comprise a DRC encoded image. A first row is processed in a step 901, performed by the processors 2905, 2968 as directed by respective software programs 2933, 2970, into tile-relative first row terms, and then those terms are saved by a following step 902, performed by the processors 2905, 2968 as directed by respective software programs 2933, 2970, to the Tile DRC Terms Store 803. For the remaining rows 903 this process iterates through the available encoded rows, getting the data (in a step 904, performed by the processors 2905, 2968 as directed by respective software programs 2933, 2970) for each row, before converting the DRC terms to tile terms (in a step 905, performed by the processors 2905, 2968 as directed by respective software programs 2933, 2970, described hereinafter in more detail with reference to FIG. 9), and then saving (in a step 906, performed by the processors 2905, 2968 as directed by respective software programs 2933, 2970) those terms to the Tile DRC Terms Store 803 to the exclusion of storing unchanged portions. The terms saved to the Tile DRC Terms Store 803 are "Delta-row encoded tiles".

Figure 9:
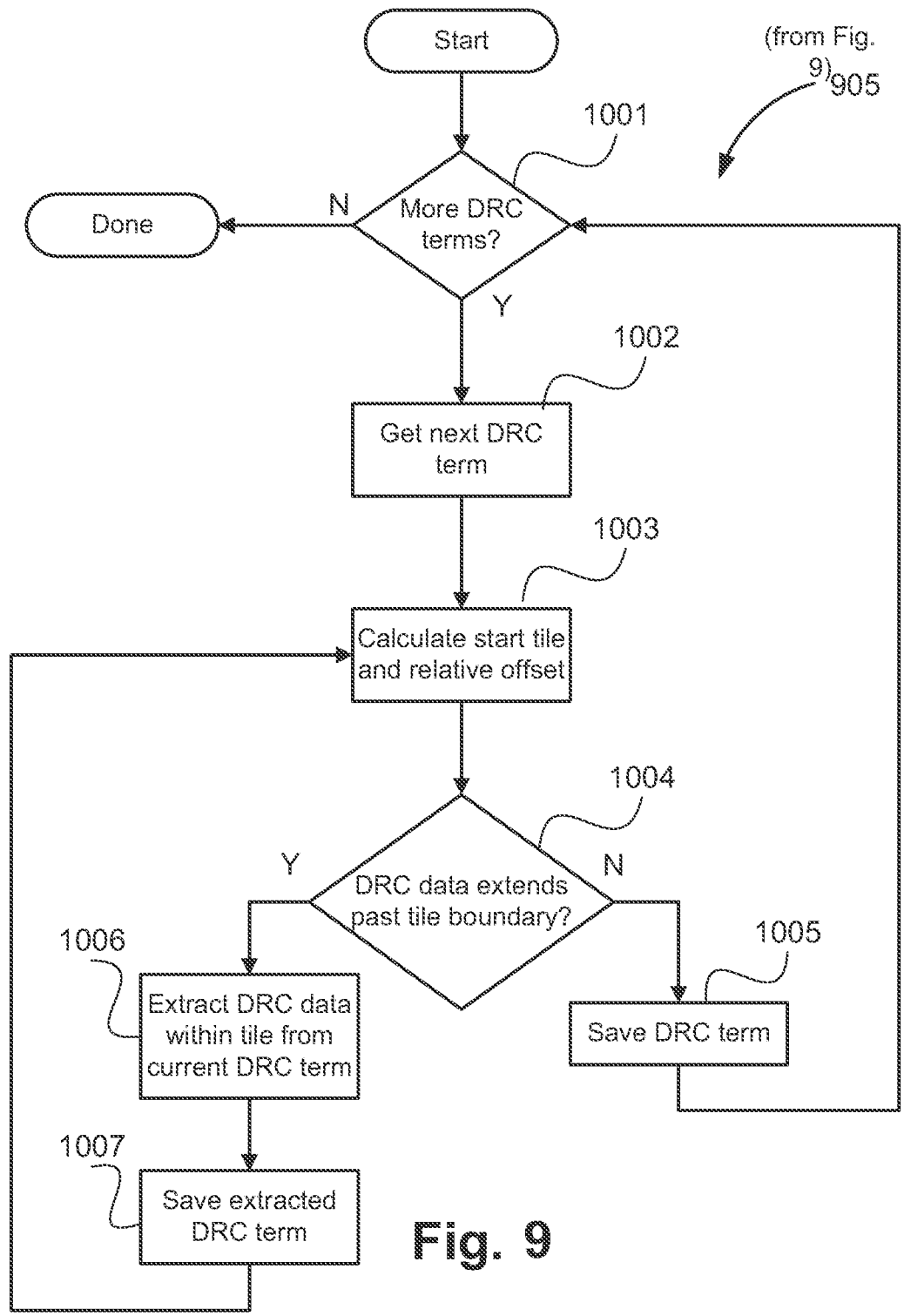
FIG. 9 shows conversion of DRC terms for an image into tile-relative DRC terms for all the tiles that comprise that image.

FIG. 9 shows a process 905, performed by the processors 2905, 2968 as directed by respective software programs 2933, 2970, for converting DRC terms (delta-compressed rows) for an image into tile-relative DRC terms (tile terms) for all the tiles that comprise that image. After checking, in a step 1001, performed by the processors 2905, 2968 as directed by respective software programs 2933, 2970, for the next available term and then obtaining that term in a step 1002, performed by the processors 2905, 2968 as directed by respective software programs 2933, 2970, this process 905 determines, in a step 1003, performed by the processors 2905, 2968 as directed by respective software programs 2933, 2970, which tile encompasses the start of that term on the current row, and the X-offset of the start of the term within that tile. The process then checks, in a step 1004, performed by the processors 2905, 2968 as directed by respective software programs 2933, 2970, if the pixels defined by the term are wholly contained within the tile, and if so the step 1004 returns a logical FALSE and the process 905 follows a N arrow and saves, in a step 1005, performed by the processors 2905, 2968 as directed by respective software programs 2933, 2970, that DRC term with term offset converted to a tile-relative value.

If at the check step 1004 it is found that the term is not wholly contained within the identified tile, then the step 1004 returns a logical TRUE and the process 905 follows a Y arrow to a step 1006, performed by the processors 2905, 2968 as directed by respective software programs 2933, 2970, which extracts that section of the term that is contained within the identified tile and then a following step 1007, performed by the processors 2905, 2968 as directed by respective software programs 2933, 2970, saves that section of the term that is contained within the identified tile, with the current DRC term modified to reflect the removal of the extracted section. The process 905 then is directed back to the step 1003 which determines the tile and offset for that modified DRC term. When no more DRC terms are found in the check step 1001, the process completes.

The process of FIG. 9 which performs conversion of the DRC terms encoding an image into tile-relative DRC terms is done by iterating through the sequence of DRC terms for each scanline of the image. This process is shown in the pseudo-code below.

Pixel-Run Generation

Figure 10:
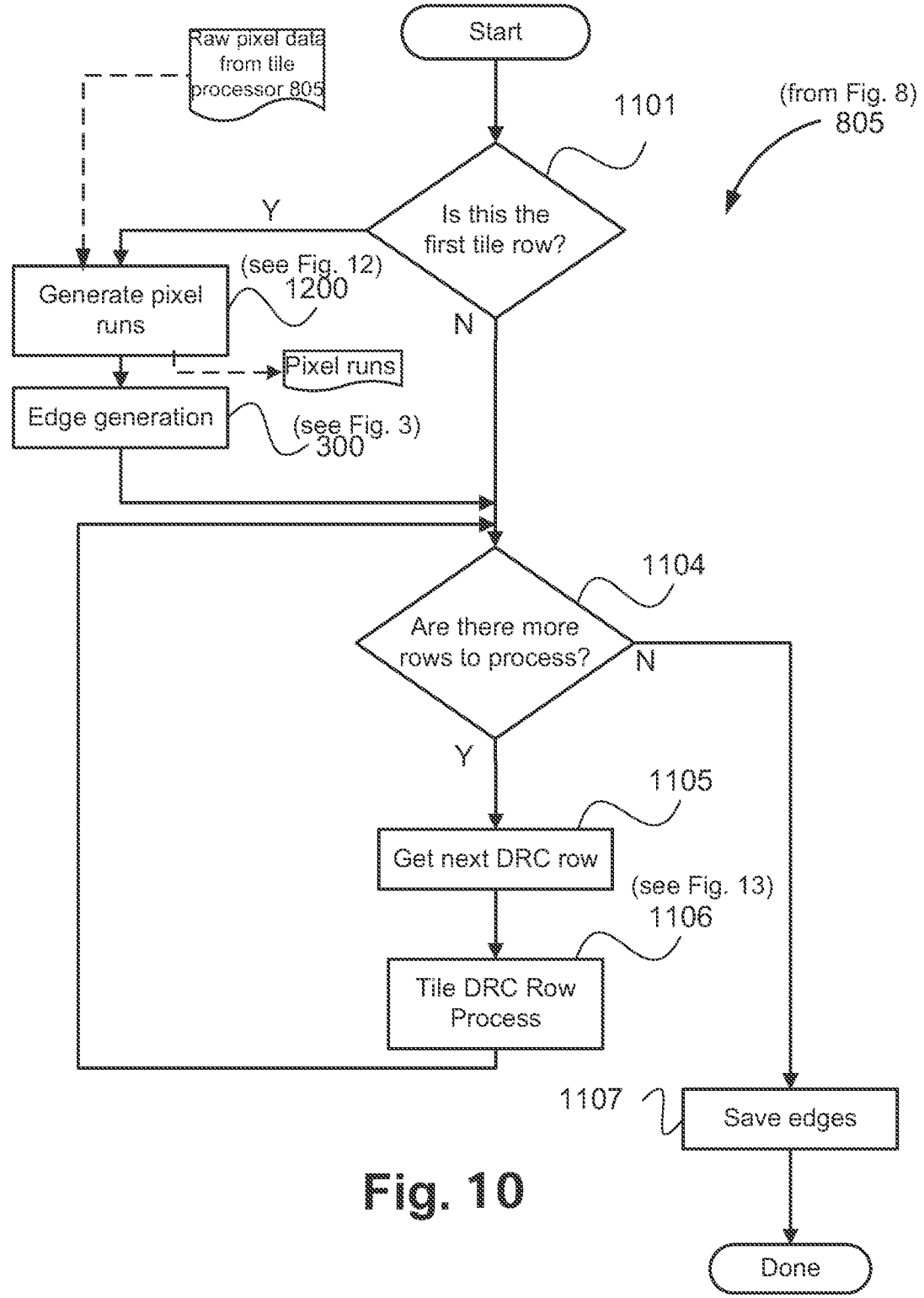
FIG. 10 shows a flow diagram of a method for processing DRC terms into edges for a tile.

FIG. 10 shows a flow diagram of a method 805, performed by the processors 2905, 2968 as directed by respective software programs 2933, 2970, for processing DRC terms into edges for a tile, as depicted in the apparatus of FIG. 7.

The process 805 in FIG. 10 commences with a start step after which a decision step 1101, performed by the processors 2905, 2968 as directed by respective software programs 2933, 2970, determines if the received data relates to the first row of the tile. If this is the case control follows a Y arrow to a step 1200, described hereinafter in more detail with reference to FIG. 11, which generates pixel runs.

FIG. 10 shows that raw pixel data is supplied to the Pixel Run Generator 1200, performed by the processors 2905, 2968 as directed by respective software programs 2933, 2970, by the Tile Processor 805, performed by the processors 2905, 2968 as directed by respective software programs 2933, 2970. For the purpose of this description pixel data is supplied as sets of contiguous pixel values, in tile raster order. In one arrangement pixel values are represented by three channels representing a red component (R), a green component (G), and a blue component (B) (referred to as RGB) with 8 bits of precision per channel (referred to as bit depth). Other colour representations such as one cyan, one magenta, one yellow and one black channel can also be utilised, along with other bit depths.

Each pixel value within a segment is processed by a Pixel Run Generator 1200.

Figure 11:
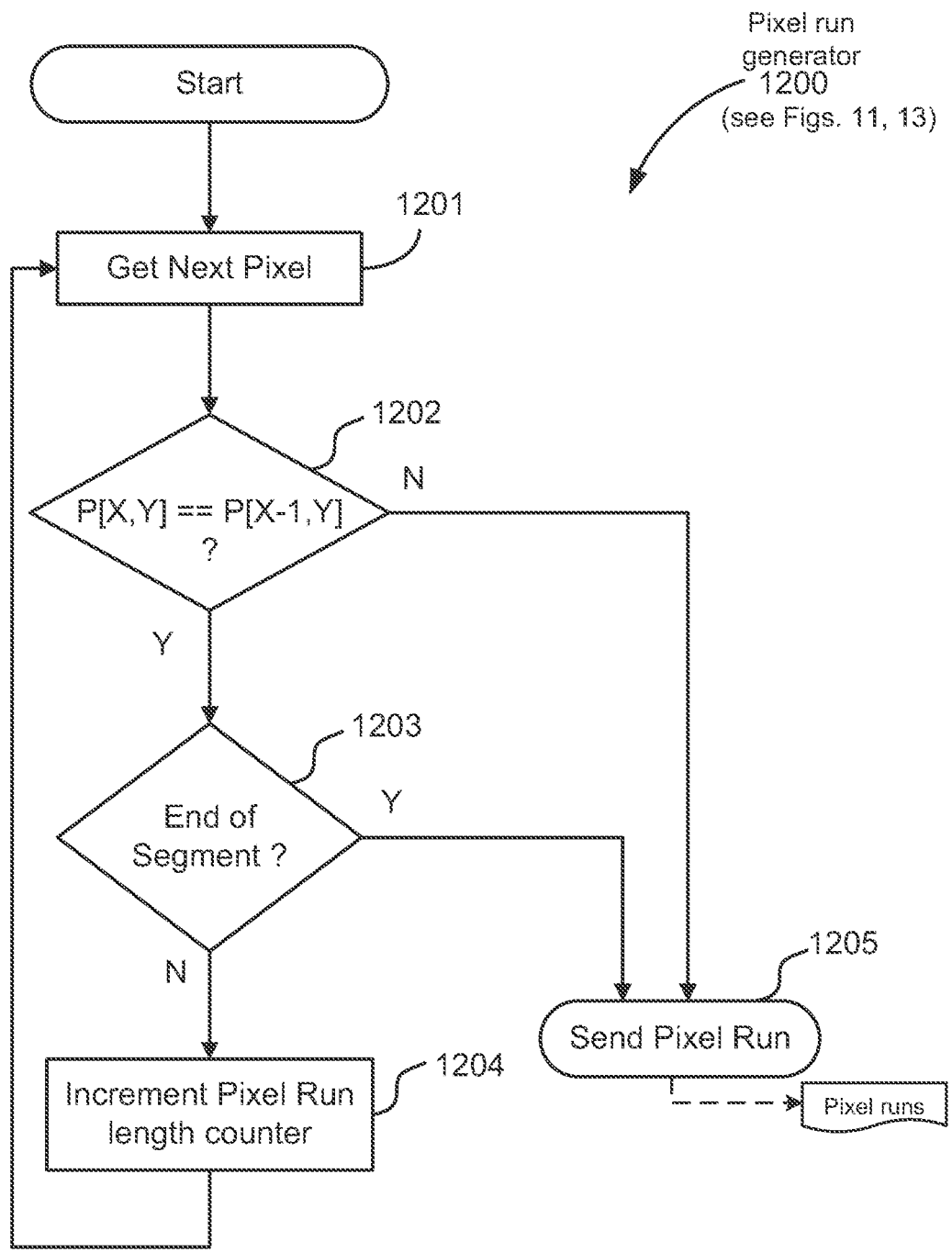
FIG. 11 shows a flow diagram of a pixel run generation process for a single pixel run on a scanline (or row) of a tile.

FIG. 11 shows a flow diagram of a pixel run generation process (which can also be considered to be a pixel run generator module) for a single pixel run on a scanline (or row) of a tile. The output of the Pixel Run Generator process 1200 is pixel runs 1205.

Figure 12:
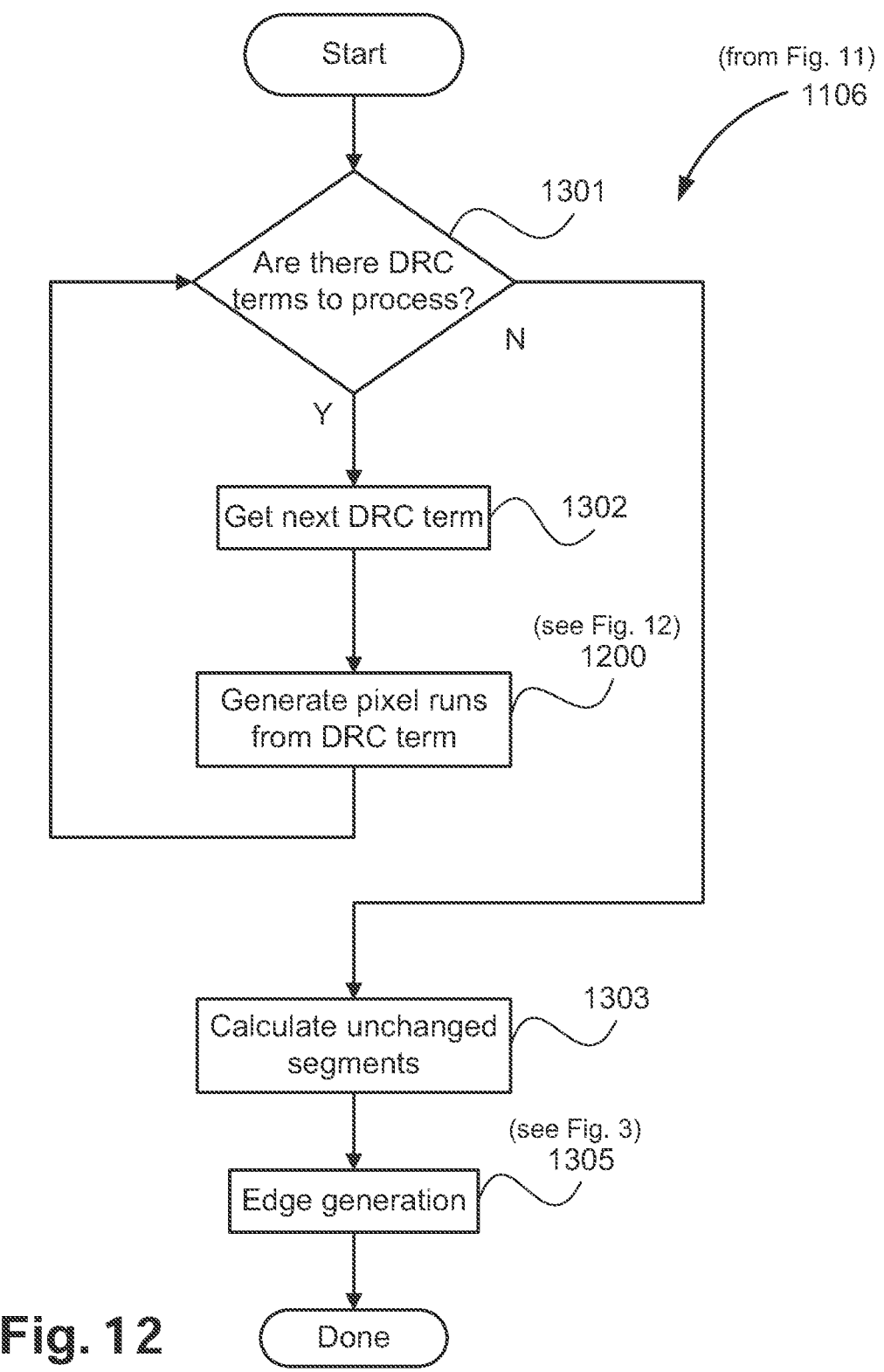
FIG. 12 shows a flow diagram of a method for processing of DRC terms into edges for a single row of a tile.

The process 1200 forms part of the process 1106 in FIG. 12, and forms part of the process 805 in FIG. 10.

The Pixel Run Generator process 1200, performed by the processors 2905, 2968 as directed by respective software programs 2933, 2970, generates pixel runs for each set of consecutive pixels values which is supplied at input. Pixel

```
x = 0           # x offset on scanline
m = 8           # width of a tile in pixels
FOR each DRC term d on the image scanline
    WHILE d.length is not zero
        x += d.offset
        c = floor(x / m)              # tile column
        t = tile at column c on current scanline
        tile_x = x - (c * m)          # x offset within tile
        # The DRC term offset only has to be changed in the first DRC term for
        # a tile. Subsequent DRC terms for that tile keep their relative offsets.
        IF this is the first DRC term for the tile t
            ofs = tile_x
        ELSE
            ofs = d.offset
        # If DRC term extends beyond the edge of this tile, need to extract the
        # portion within the tile
        IF (tile_x + d.length > m)
            len = m - tile_x          # calc length of DRC term within tile
            d.length -= len           # update DRC term length
            d.offset = 1              #   and offset
        ELSE
            len = d.length            # use complete DRC term
            d.length = 0
        pixels = extract len pixels from DRC term d
        # Output the tile relative DRC term
        output DRC term (ofs, len, pixels) for tile t
        x += (len - 1)
``` run information is stored in a suitable data structure which contains at least a colour value for the pixel run and a pixel run length counter for storing the length of the pixel run.

Pixel information is received in a get-next-pixel step 1201, performed by the processors 2905, 2968 as directed by respective software programs 2933, 2970, on a pixel by pixel basis. It is then determined, in a following pixel-comparison step 1202, performed by the processors 2905, 2968 as directed by respective software programs 2933, 2970, whether a current pixel colour value PX,Y is identical to an immediately preceding pixel colour value PX−1,Y. If the current pixel colour value PX,Y is identical to the previous pixel colour value PX−1,Y then the process 1200 follows a Y arrow to a following check-end-of-segment step 1203, performed by the processors 2905, 2968 as directed by respective software programs 2933, 2970, which determines whether the segment has ended. If the segment has not yet ended, then the process 1200 follows a N arrow to an increment-pixel-run-length-counter step 1204, performed by the processors 2905, 2968 as directed by respective software programs 2933, 2970, which increments the pixel run length counter, and the process 1200 returns to the get-next-pixel step 1201 from where the next pixel in the segment is processed. If it is determined in the pixel-comparison step 1202 that the current pixel colour value PX,Y is not identical to the previous pixel colour value PX−1,Y, or if it is determined in the step 1203 that the segment has ended, the process 1200 follows respective N arrows to a step 1205, performed by the processors 2905, 2968 as directed by respective software programs 2933, 2970, indicating that the pixel run is ended, and the process 1200 sends the pixel run for edge generation via the send-pixel-run step 1205.

Returning to FIG. 10 after completion of the step 1200 the process 805 continues to an edge generation step 300, described hereinafter in more detail with reference to FIG. 2.

Edge Generation from DRC Terms

One disclosed arrangement modifies the edge generation process to take advantage of the information available from delta-row compression on the segments of the current row which are changed or unchanged from the seed row.

When processing a current row, pixel runs only need to be generated for the changed segments in that row. An active edge from the seed row which is incident only on an unchanged segment in the current row can be extended to include the unchanged segment.

It is possible that the first or last pixel run in a changed segment may have the same colour as an adjacent pixel run in the preceding or following unchanged segment, and where that is the case, the edge describing the first of the two (2) pixel runs should be extended to include both pixel runs. The colour of the first pixel run in the changed segment is compared with the colour of the preceding edge on that row to determine if that pixel run can be combined with the preceding pixel run. The colour of the first pixel in the following unchanged segment is determined from the edge on the seed row which is at, or immediately preceding, the X-offset of the start of that unchanged segment. Once this colour is known it may be compared with the colour of the last pixel run in the changed segment, and if they match, the pixel run in the changed segment will be extended to include the first pixel run in the unchanged segment.

Returning to FIG. 10, after completion of the step 300, the process 805 is directed to a decision step 1104, performed by the processors 2905, 2968 as directed by respective software programs 2933, 2970, which determines if there are more tile rows to process. If this is not the case, control follows a N arrow to a step 1107, performed by the processors 2905, 2968 as directed by respective software programs 2933, 2970, which saves the edges. The process 805 then terminates.

Returning to the step 1104, if there are more tile rows to be processed, then control follows a Y arrow to a step 1105, performed by the processors 2905, 2968 as directed by respective software programs 2933, 2970, which fetches the next DRC row. Thereafter a step 1106, described hereinafter in more detail with reference to FIG. 12, performs a tile DRC row process, performed by the processors 2905, 2968 as directed by respective software programs 2933, 2970.

FIG. 12 shows a schematic flow diagram of the Tile DRC Row Process 1106 in FIG. 10. The input is DRC terms for a tile row from the Tile DRC Terms Store 803. After checking in a step 1301, performed by the processors 2905, 2968 as directed by respective software programs 2933, 2970, if there are DRC terms to process, if this is the case the process 1106 proceeds to a step 1302, performed by the processors 2905, 2968 as directed by respective software programs 2933, 2970, which retrieves a next DRC term from the DRC Terms Store 803 and a following step 1200, performed by the processors 2905, 2968 as directed by respective software programs 2933, 2970, generates pixels runs from the pixels specified by that DRC term. The process 1106 then returns to the step 1301 and the loop comprising the steps 1301, 1302 and 1200 iterates until there are no further DRC terms to process.

Once it is determined by the step 1301 that there are no remaining DRC terms for the current row to process, the process 1106 follows a N arrow to a step 1303, performed by the processors 2905, 2968 as directed by respective software programs 2933, 2970, which determines the unchanged segments on the row as the segments encompassing the pixels not defined by the DRC terms for the row. In other words, if for example there is a row of 64 pixels, with DRC terms for pixels 10-16, and 30-36, then it is known that there are unchanged segments covering pixels 0-9, 17-29 and 37-63. This is known from the offsets and lengths of the DRC terms for the row, without needing to actually decode the row. This calculation provides the X-offset and length of the unchanged segment on the row. A following edge generation step 1305, performed by the processors 2905, 2968 as directed by respective software programs 2933, 2970, then uses the pixel runs that were found and the calculated unchanged segments to generate edges for the current row, as described in more detail with reference to FIG. 3. This edge detection is performed in regard to the changed portions, bypassing an edge detection process for unchanged portions. Once that is done this process 1106 completes.

Figure 13A:
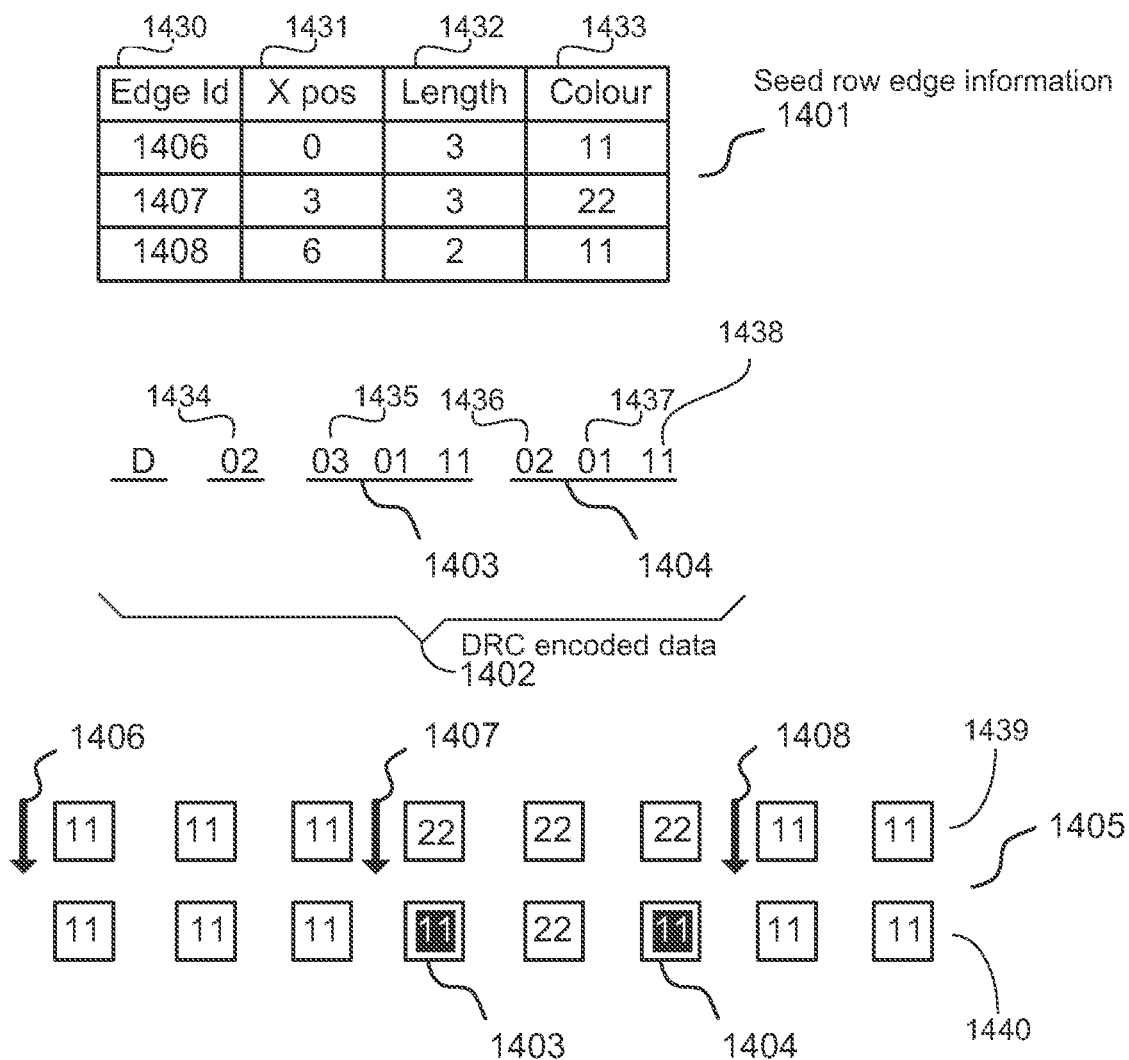
FIG. 13A shows the context for an example of edge generation from DRC encoded data for an 8-pixel tile row.

FIG. 13A depicts the context for an example of edge generation (see the steps 300 and 1305 in FIGS. 10 and 12 respectively from DRC encoded data for an 8-pixel tile row.

Considering an example in which a seed row has been previously found to produce a set 1401 of seed row edge information comprising 3 edges 1406, 1407 and 1408. Each edge is characterised by an Edge Id 1430, an X position 1431 of the start of the edge, a length 1432 (specifying the number of pixels in the pixel run referenced by that edge), and a colour 1433 of the pixels in the pixel run referenced by that edge. The edge generation 300 process only stores this edge data for the seed row, with none of the data available for the pixels in the seed row.

A current row is defined by DRC encoded data 1402 (comprising a set of DRC terms), which specifies 2 (as depicted by a reference numeral 1434) changed segments 1403 and 1404. Those changed segments start at absolute offsets 3 (as depicted by a reference numeral 1435) and 5 (as depicted by a reference numeral 1436 which refers to a relative offset 2 from 1435 which thus translates to an absolute offset 5) in the row, and each specifies 1 pixel (as depicted by a reference numeral 1437) having the colour value 11 (as depicted by a reference numeral 1438).

The corresponding pixels of the seed row 1439 and the pixels of the current row 1440 are shown at 1405 in FIG. 13A. The pixel colours on the seed row 1439 are derived from the supplied information for the seed row edges 1406, 1407 and 1408. The pixel colours on the current row 1440 are expected to be identical to the pixels at the same x-offset on the seed row 1439, except where the pixels of the current row 1440 are changed as depicted by the DRC terms of the DRC encoded data 1402. It must be highlighted that during the edge generation process for the current row 1440, only the edge information 1401 from the seed row 1439, and the DRC terms of the DRC encoded data 1402 for the current row 1440 are available. All other pixel values are not known, and are shown here only for illustration purposes.

Figure 13B:
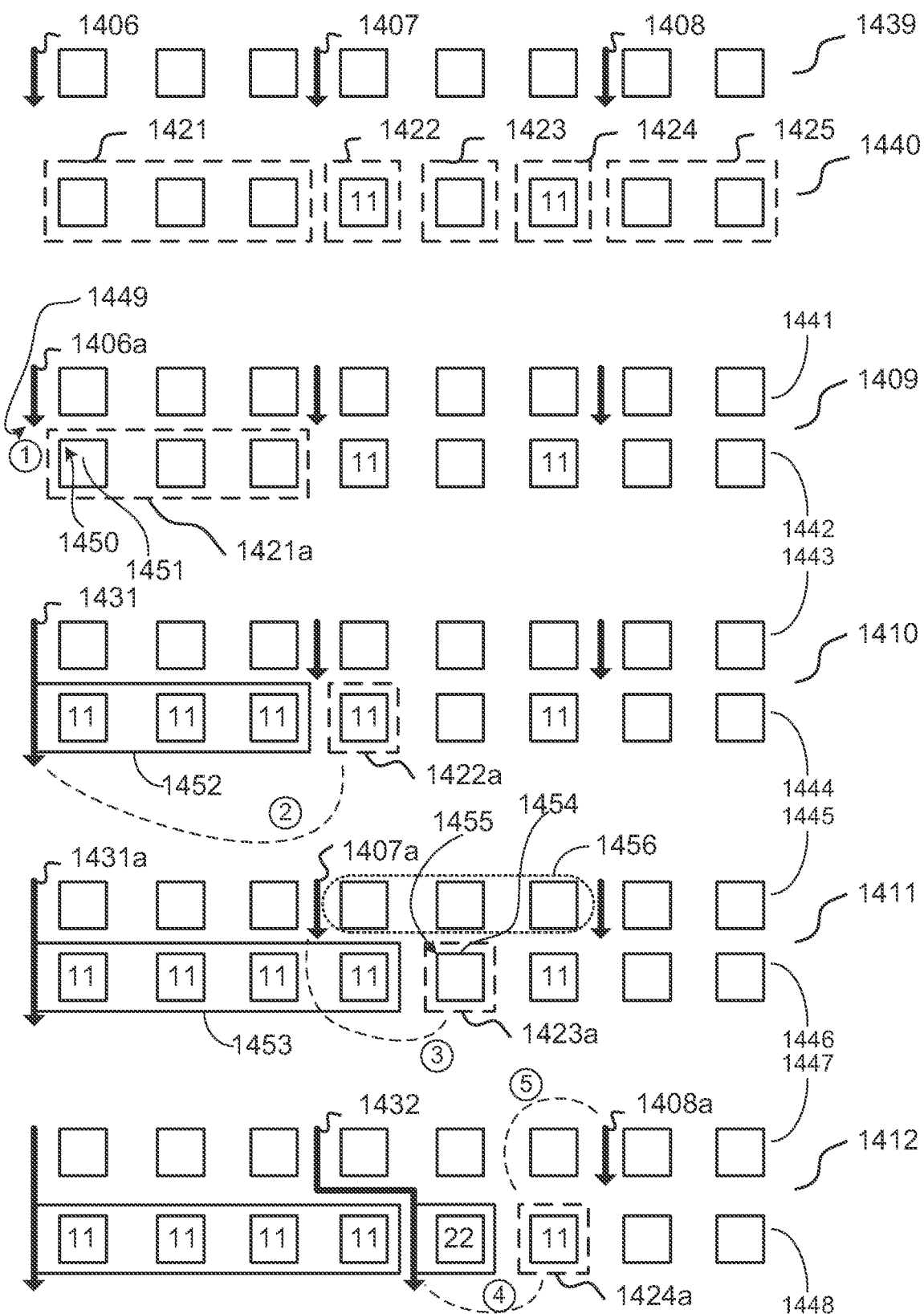
FIGS. 13B & 13C show an example of edge generation from DRC encoded data for an 8-pixel tile row.
Figure 13C:
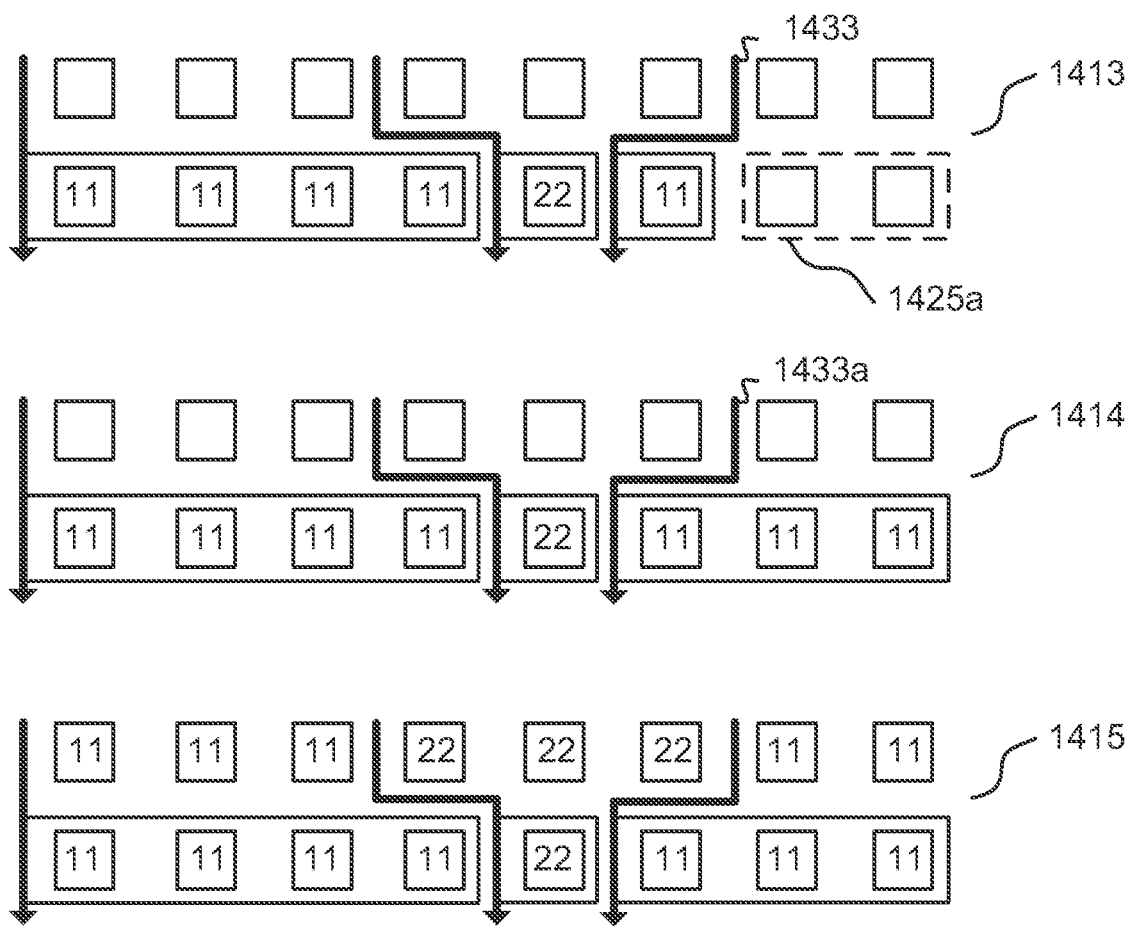

FIGS. 13B and 13C show an example of edge generation from DRC encoded data for an 8-pixel tile row, based on the example in FIG. 13A.

Successive instances of the seed row 1439 are depicted by reference numerals 1441, 1443, 1445 and 1447. Successive instances of the current row 1440 are depicted by reference numerals 1442, 1444, 1446 and 1448.

The seed row 1439 and the current row 1440 are shown with the known edges 1406, 1407 and 1408 from the seed row 1439, and pixel values from DRC terms in the DRC encoded data 1402 for the current row 1440. The current row 1440 is comprised of 5 segments 1421-1425, of which 3 are unchanged segments ie 1421, 1423 and 1425, and 2 are changed segments ie 1422 and 1424. The changed segments 1422 and 1424 are evaluated for pixel runs, and found to each contain a single pixel run of one pixel.

With the edge 1406 of the seed row 1439 depicted by a reference numeral 1406a as the active edge in the seed row 1441, the unchanged segment 1421 in the current row 1440, depicted as 1421a in the current row 1442, is evaluated as depicted by a reference numeral 1409. This unchanged segment 1421a may contain one or more pixel runs, however, the number and length of those pixel runs is not known as the pixels in the unchanged segment 1421a have not been decoded. As the active edge 1406a is incident on that unchanged segment 1421a (e.g., leading extremity 1449 of the active edge 1406a is adjacent to a corner 1450 of an end pixel 1451 of the segment 1421a) and is not also incident with a changed segment, the active edge 1406a can be extended, as depicted by an edge 1431 to include (ie to reference) the unchanged segment 1421a as depicted by 1452. The aforementioned process is depicted by a reference numeral 1 in a circle.

As the active edge 1406a has been extended as depicted by the edge 1431, the next edge 1407 on the seed row is now selected as an active edge 1407a as depicted by a reference numeral 1411.

A next pixel run 1422a on the current row 1444 is from a changed segment, so it is evaluated as a potential extension of the preceding unchanged segment 1452. This is done, as depicted by a dashed line having a reference number 2 in a circle, by comparing the colour of the pixel run 1422a with that of the previous edge 1431. As they match, the edge data of the previous edge 1431 is modified as depicted by a reference numeral 1431a to include the pixel run 1422a, as depicted by 1453.

The active edge 1407a is unchanged as depicted by a reference numeral 1410.

A next pixel run 1423a on the current row 1446 is the following segment which is an unchanged segment, and so this unchanged segment is evaluated as a potential extension of the preceding pixel run from the changed segment. The colour, number and length of pixel runs in the unchanged segment 1423a is not known, but the colour of the first pixel run in the unchanged segment can be determined, as depicted by a dashed line having a reference numeral 3 in a circle, from the edge on the seed row with the largest x-offset t less than or equal to the x-offset of the unchanged segment, this being the edge 1407a. This edge 1407a provides the colour value 22. This colour value does not match that of the colour of the previous edge 1431a on the current row and so the edge information of that edge 1431a cannot be extended to reference the unchanged segment 1423a. However, the current pixel run 1423a is connected to the active edge 1407a, as the pixel run 1423a has an edge 1454 or a corner 1455 in contact with the pixels defined by the active edge 1407a, and so the active edge 1407a is extended, as depicted by a reference numeral 1432, to reference the current pixel run 1423a.

As the active edge 1407a has been extended, the next edge on the seed row 1408a is selected as the active edge as depicted by a reference numeral 1412.

The next pixel run 1424a is from a changed segment. The colour value of that pixel run is compared, as depicted by a dashed line having a reference numeral 4 in a circle, with that of the preceding edge 1432. As the colour values are different, the pixel runs cannot be combined. However, when the current pixel run 1424a colour value is compared, as depicted by a dashed line and a reference number 5 in a circle, with that of the active edge 1408a they match, and as that edge is incident with the current pixel run 1424a they can be joined as depicted by 1433 (see FIG. 13C) to thereby extend the active edge 1408a (as depicted by a reference numeral 1413).

No more edges are available from the seed row to be an active edge.

FIG. 13C shows that the remaining pixel run 1425a is selected as the current pixel run. It is from an unchanged segment. When the colour value of the current pixel run 1425a is compared with that of the preceding edge 1433 (ie 1408), they match, and the edge data of the edge 1433 is modified as depicted by a reference numeral 1433a to reference the current pixel run 1425a (as depicted by a reference numeral 1414).

As there are no more segments in the current row, edge generation is complete for that row (as depicted by a reference numeral 1415).

Parallel Processing of Tiles

Figure 14:
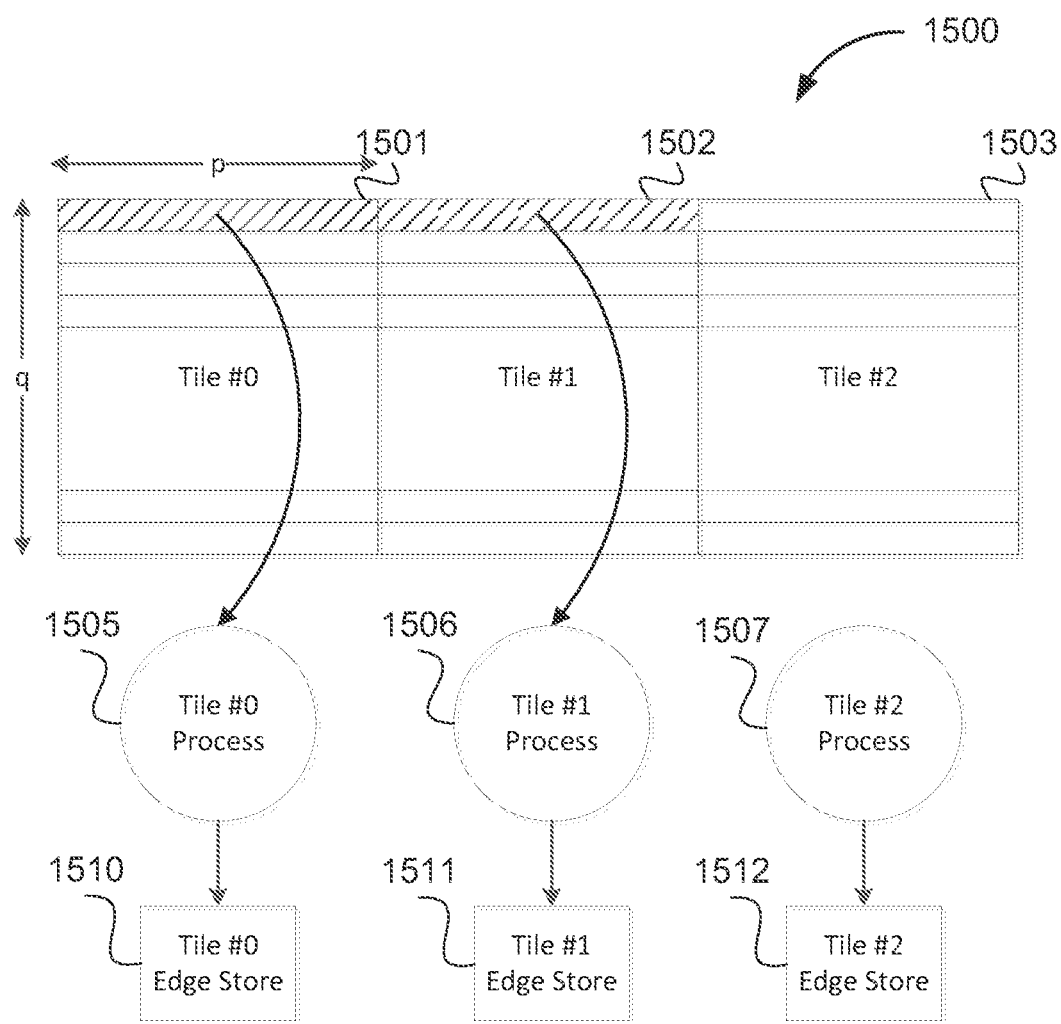
FIGS. 14 and 15 show a process for processing tile rows in parallel.

FIG. 14 shows 3 tiles 1501, 1502 and 1503, selected from the first row of tiles of a nominal image. Each tile contains p columns and q rows of pixels. For each tile there is an associated process, performed by the processors 2905, 2968 as directed by respective software programs 2933, 2970, which takes the DRC data for that tile and generates edges which are then stored in an associated edge store. For example, the DRC data for Tile #0 (ie 1501) is processed into edges by a Tile #0 Process (ie 1505) to generated edges that are stored in a Tile #0 Edge Store 1510. Similarly, tiles

1 (ie 1502) and #2 (ie 1503) are processed by Tile #1 Process (ie 1506) and Tile #2 Process (ie 1507) respectively, with the generated edges stored in Tile #1 Edge Store (ie 1511) and Tile #2 Edge Store (ie 1512) respectively.

The conversion of DRC data into edges can be done in parallel using independent processing by the 3 tile processes 1505 to 1507, with each able to start as soon as DRC data for a row in the appropriate tile is available. The DRC data is received as a sequence of DRC terms for each image row. With an image comprising multiple tiles in the horizontal direction, it is likely that as DRC terms are received, there will be enough to start processing a tile, while still continuing to receive further DRC terms for that row.

In FIG. 14, the first row of Tile #0 (ie 1501) and Tile #1 (ie 1502) is being processed into edges. At this point in time, the DRC terms that define the first row data for Tile #2 are not yet available.

Figure 15:
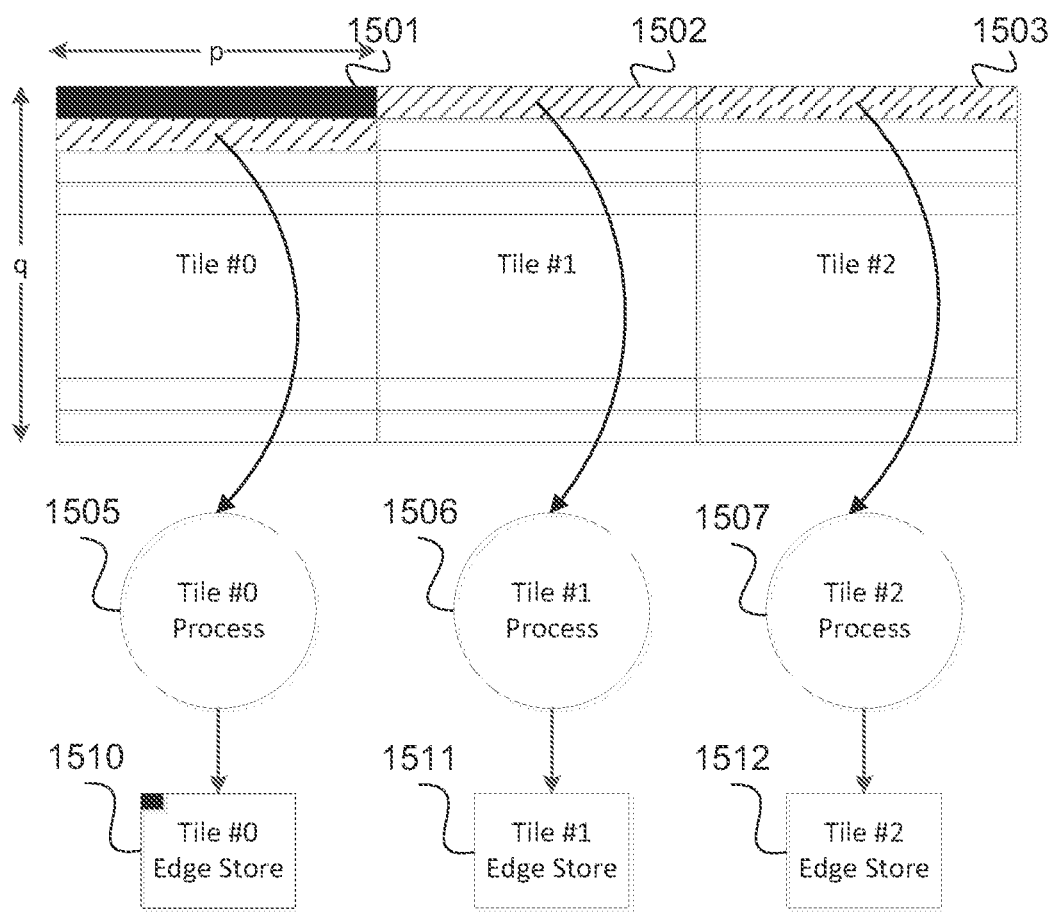

At some time later, as shown in FIG. 15, the first row of Tile #2 (ie 1503) is being processed, as is the $2^{nd}$ row of Tile #0 1501. Processing of the first row of Tile #0 1501 is completed, with the generated edges stored in the Tile #0 Edge Store 1510.

Edge Compression

After all Tile DRC terms have been processed by the Tile Processor 805, the Edge Compressor 810 compresses the edge data stored in the Edge Store 814 using a lossless compression method, creating a lossless data bitstream that is passed to the Compressed Data Memory Manager 819 (FIG. 7).

Inter-Tile Dependencies During Edge Generation

Only the first scanline of a DRC encoded image is supplied as explicit pixels, with the remaining rows expressed as DRC terms. The conversion process from a DRC encoded image to DRC encoded tiles will convert the first scanline of an image into the corresponding first rows of pixels for each of the tiles in the first tier of tiles that comprise that image. Subsequent image scanlines will be converted into tile—relative DRC terms. As images rows are received, the DRC terms comprising each image row are converted to tile relative DRC terms. Once all the tile relative DRC terms have been produced for a given tile row, that row can then be processed for edge generation. The conversion of image DRC terms into tile relative DRC terms is a sequential operation on the image DRC terms received in raster order. However, the processing of a tile row into edges can be performed in parallel with the same operation for other tiles.

The image data received for the $2^{nd}$ and subsequent tiers of tiles will only contain DRC terms, and not explicit pixels for the first row of pixels, unlike for the $1^{st}$ tier of tiles. This means that edge generation for the $2^{nd}$ and subsequent tiers of tiles cannot be performed directly from the received image input, as the first row of each tile is only expressed as DRC terms, and so the pixel values in the unchanged segments of the row are not known.

There are 2 provided solutions to this issue. A $1^{st}$ solution is for each tile in the $2^{nd}$ and subsequent tiers of tiles to have a reference to the edges generated by the last pixel row of the tile at the same X-offset in the tile tier above. The combination of these edges, along with the tile-relative DRC terms for the first tile row, will allow the edge generation process described above to generate edges for the first pixel row of the tiles in the $2^{nd}$ and subsequent tiers of tiles. This does however constrain the parallel processing of tiles as edge generation for a tile in the $2^{nd}$ and subsequent tiers of tiles cannot commence until edge generation has completed for the tile at the same X-Offset in the tile tier above. Effectively tiles in a particular column of tiles are processed sequentially, although columns of tiles can be processed in parallel.

The $2^{nd}$ solution involves a modification to the process of converting image DRC terms to tile DRC terms. As each scanline of the image is processed, a record is kept of the flattened DRC terms for all scanlines in the image, up to and including the current scanline, described hereinafter in more detail with reference to FIG. 26. This set of flattened DRC terms for the current scanline effectively encodes the difference between the first scanline of the image and the current scanline. This DRC term flattening process is described below with reference to FIG. 27. Where the current scanline of the image corresponds to the first row of pixels of a tier of tiles, the flattened DRC terms can be used to decode the pixels for that scanline directly from the first scanline of the image. These decoded pixels can then be sent to each of the tiles in the tier of tiles as the pixels for the first pixel row in each of those tiles. This allows independent parallel edge generation for all the tiles comprising the image constrained only by the raster order of received DRC terms, at the cost of maintaining the flattened DRC term for the current scanline of the image during conversion to tile relative DRC terms.

The flattening of DRC terms is an iterative process performed during processing of image DRC terms. It maintains a flattened set of DRC terms for the current scanline which represent the changes between the first scanline of the image and that current scanline. If the flattened set of DRC terms for the current scanline were applied to the first scanline of the image, the row of pixels produced would be that for the current scanline. Hence maintaining a flattened set of DRC terms provides a mechanism for decoding a given scanline of the DRC encoded image, without the need to actually decode the previous scanlines.

FIG. 26 shows an example 2700 of an 8×8 image with pixel colours represented as integers. This image is encoded using DRC to produce DRC Terms 2701. These DRC Terms 2701 represent the pixel changes in each row of the image 2702. During processing of the DRC Terms 2701, Flattened DRC Terms 2701 are produced for each row of the image. This is done by:

Truncating or shortening a DRC Term where it is overlapped by a DRC Term on a subsequent scanline;

Dropping a DRC Term where it is completely masked by a DRC Term on a subsequent scanline; and Combining DRC Terms on different scanlines where they overlap with equivalent colours This flattening of DRC terms is most effective where those terms are sparse, that is, where there are minimal changes between scanlines of an image. In the worst case the flattening degenerates into a set of DRC terms which fully define a scanline, which while it is a regression to effectively decoding that scanline, does not require fully decoding the previous scanlines.

Example(S)/User Case(S)

Example #1

Figure 16A:
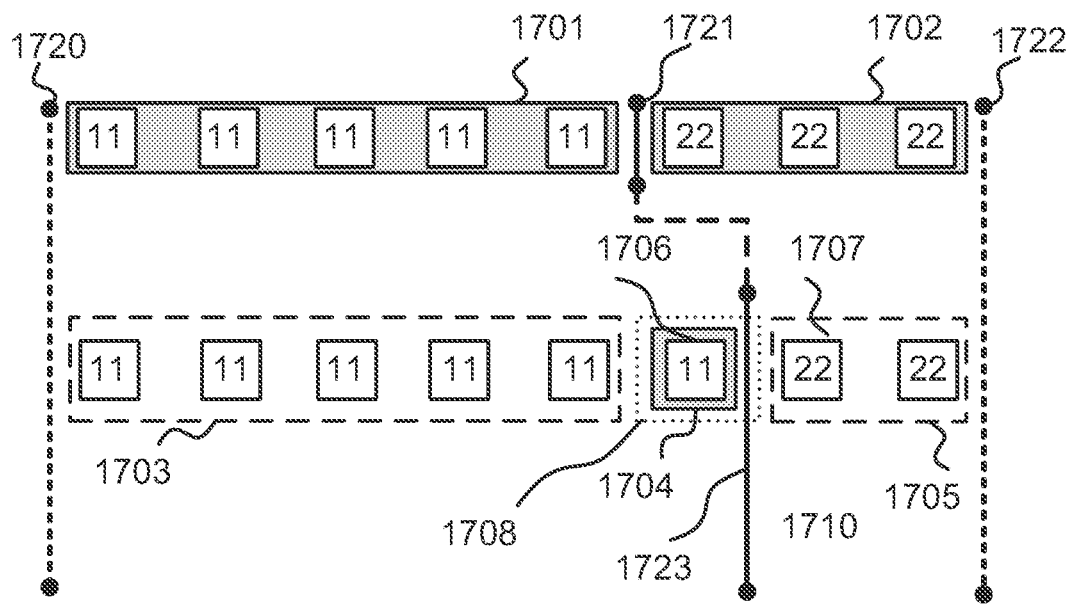
FIGS. 16A and 16B show an example of the disclosed transcoding method being applied.
Figure 16B:
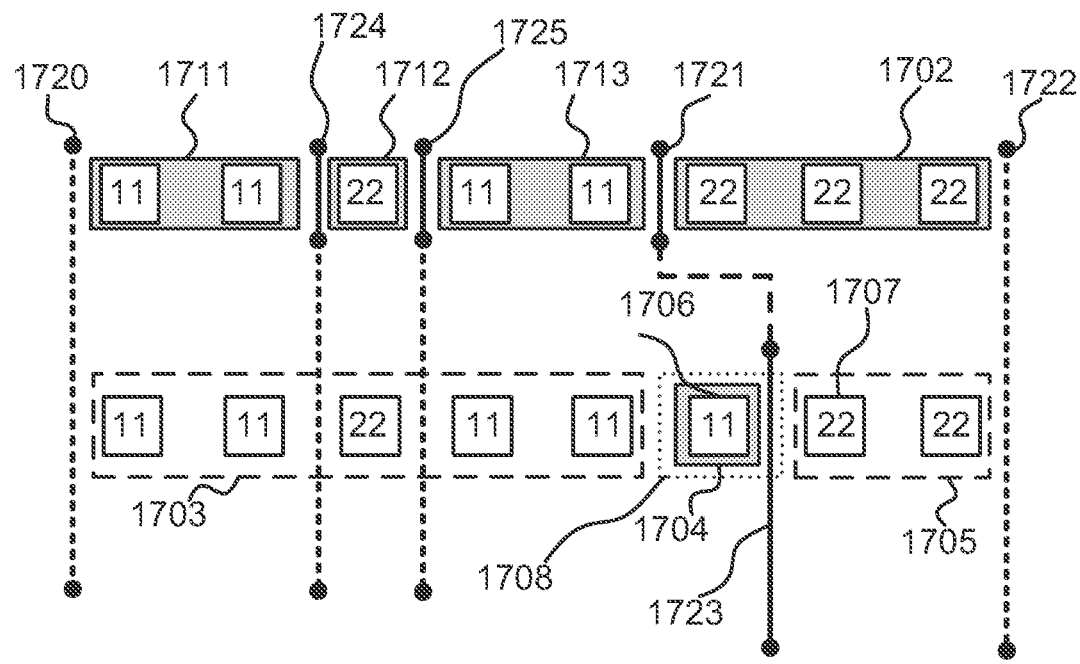

FIGS. 16A and 16B show examples of the disclosed transcoding arrangements and its advantage shall be described. Two scanlines of an eight pixel by eight pixel tile 1700 are shown, with pixel colour values specified as integers. The Pixel Run Generator 1200 generates two pixel runs 1701 and 1702 for first scanline. Each pixel run also generates an active edge pair by the Edge Generator 300. The two edge pairs are 1720 with 1721, and 1721 with 1722. No edges pairs are assessed during processing on the first scanline since all edges are still active.

At the second scanline, there is a single DRC term which defines a single changed pixel 1706 at offset 5. The remaining pixels outside this DRC term are hence known to be unchanged from the previous scanline and so form the unchanged segments 1703 and 1705. The changed segment 1708 is evaluated for pixels runs, producing a single pixel run 1704 containing the pixel 1706. The Edge 1720 is selected as the active edge from the seed row, and the unchanged segment 1703 is selected as active on the current row. The active edge 1720 only intersects with the active segment 1703 on the current row, and as the active segment 1703 is an unchanged segment the active edge 1720 is extended to the current row with the same X-offset.

With the edge 1720 and the segment 1703 completed, the next segment/pixel-run 1704 is then selected as active on the current row, and the next edge 1721 is selected as active from the seed row. The colour '11' of the active pixel run 1704 is compared with that of the previous edge 1720 on the current row. As they match, the edge information of the edge 1720 is changed to include the active pixel run 1704. With the pixel-run 1704 completed, the next segment/pixel-run 1705 on the current row is elected as active. As this is an unchanged segment, the colour of any pixel-run or runs in the segment are unknown. The colour of the first pixel in this segment is determined from the edge on the seed row with the greatest X-offset value less than or equal to the X-offset on the current row of the active segment 1705. As this edge is found to be the active edge 1721, that edge can be extended to the current row at the X-offset of the start of the active segment 1705. As the active edge 1721 has been completed, the next edge on the seed row 1722 is selected as active. As this edge is a terminating edge, it is automatically extended to the current row.

FIG. 16B shows a similar example to FIG. 16A, except that in the example of FIG. 16B the Pixel Run Generator 1200 generates four pixel runs 1711, 1712, 1713 and 1702 for first scanline.

Each pixel run also generates an active edge pair by the Edge Generator 300. The four edge pairs are 1720 with 1724, and 1724 with 1725, 1725 with 1721, and 1721 with 1722. No edges pairs are assessed during processing on the first scanline since all edges are still active.

At the second scanline, there is a single DRC term which defines a single changed pixel 1706 at offset 5. The remaining pixels outside this DRC term are hence known to be unchanged from the previous scanline and so form the unchanged segments 1703 and 1705. The changed segment 1708 is evaluated for pixels runs, producing a single pixel run 1704 containing the pixel 1706. The Edge 1720 is selected as the active edge from the seed row, and the unchanged segment 1703 is selected as active on the current row. The active edge 1720 only intersects with the active segment 1703 on the current row, and as the active segment 1703 is an unchanged segment the active edge 1720 is extended to the current row with the same X-offset.

With the edge 1720 and the segment 1703 completed, the next segment/pixel-run 1704 is then selected as active on the current row, and the next edge 1724 is selected as active from the seed row. The active edge 1724 is not incident with the selected pixel run 1704 on the current and is only incident on the current row with the unchanged segment 1703, hence the active edge 1724 is extended to the current row. With the edge 1724 completed, the next edge 1725 is selected as active from the seed. Similarly to edge 1724, the active edge 1725 is extended to the current row. With the edge 1725 completed, the next edge 1721 is selected as active from the seed row. The processing of the remaining edges from the seed row, and pixel-runs/segments from the current row is the same as in the example of FIG. 16A.

The disclosed transcoding arrangements allow the second scanline in both these examples to be processed with only 1 pixel being passed to the Pixel Run Generator 1200, whereas without the disclosed transcoding arrangements all 8 pixels of the scanline would have needed to be processed by the Pixel Run Generator 1200 before edge generation could be done.

Example #2

FIG. 17 shows an example of the disclosed transcoding arrangements and their advantages shall be described. A table 1801 of edges for a seed row 1803 includes information on 3 edges, 1810, 1821 and 1822. The seed row 1803 described by these edges has 3 pixel runs, corresponding to the 3 edges.

A DRC term 1804 for a (subsequent) current row describes 3 changed pixels, at an offset of 8 pixels from the X-offset of the start of the row. When that DRC term 1804 is applied to the seed row, only 3 pixels, depicted by 1805, are changed from those pixels on the seed row. The set of changed pixels on the current row means that the current row is split into 3 segments as depicted at 1806, two of which are unchanged from the seed row, and one of which is changed.

The pixel values in the unchanged segments are only known from the colour values associated with edges on the seed row which are incident with those segments. When the 1st segment is of the current row is evaluated at 1807 along with incident edges from the seed row, as the $1^{st}$ segment of the current row is an unchanged segment, an edge from the seed row that is incident only on this segment is simply extended with the same x-offset and zero additional offset on the current row as on the seed row.

The same applies to the 3rd segment 1809, however in this case there is no incident edge to extend.

The 2nd segment of the current row is a changed segment, and hence contains pixels that are changed from the previous row. The $2^{nd}$ segment is evaluated for pixel runs, and then those runs checked for their effect on incident edges from the seed row 1808. The final result of applying the DRC term 1804 to the edges from the seed row 1801 is that all 3 edges are extended as depicted at 1810.

Figure 17A:
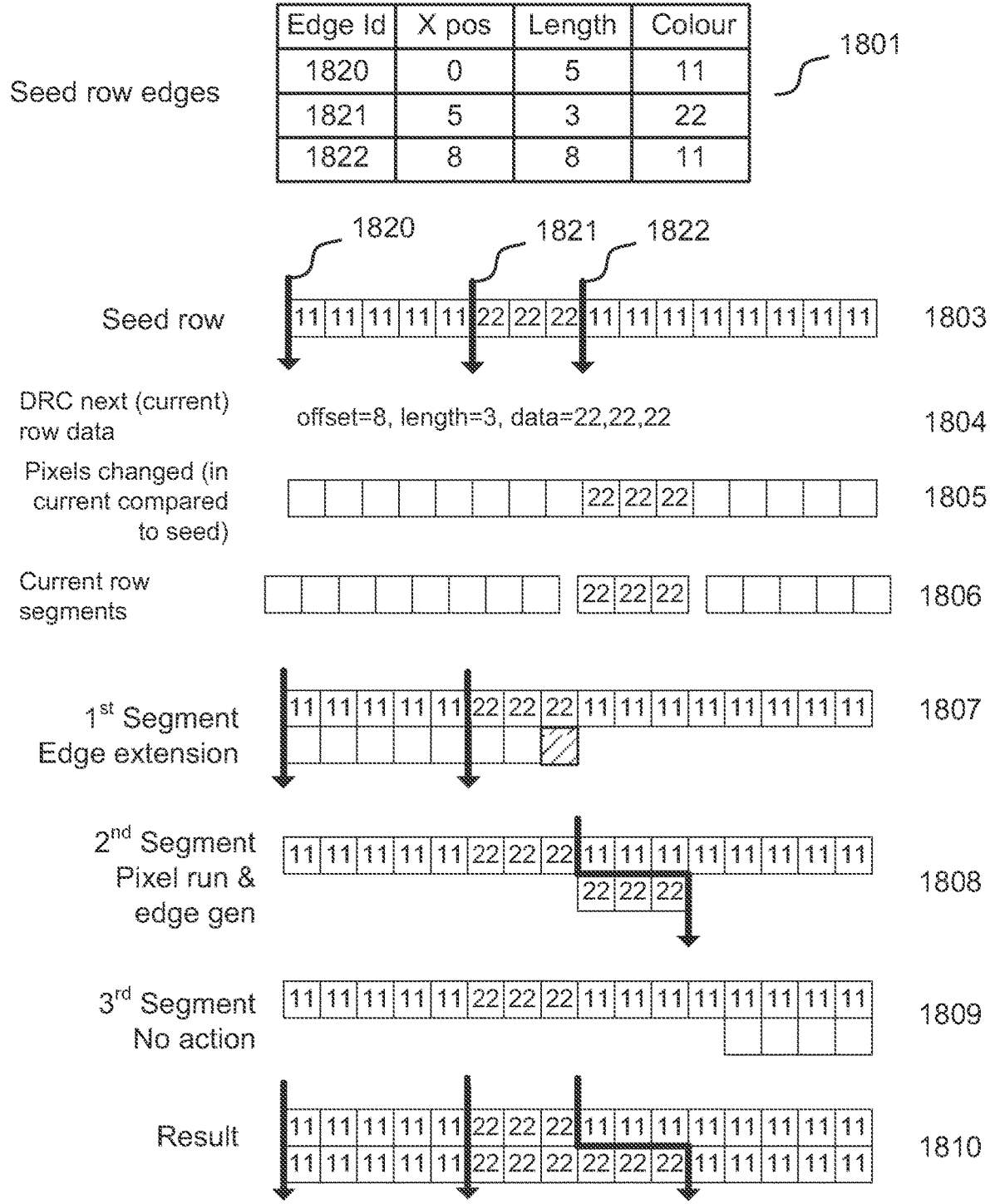
FIGS. 17A and 17B show an example of transcoding from DRC data to edges.
Figure 17B:
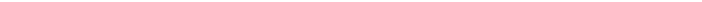

FIG. 17B shows a continuation of the process depicted in FIG. 17A, showing how the current row becomes the seed row as depicted at 1818, and then a DRC term 1811 for a (subsequent) current row is applied to the new seed row 1818.

When the DRC term 1811 is applied to the seed row 1818, only 3 pixels will be changed as depicted at 1812 from those on the seed row. The set of changed pixels on the current row means the current row is split into 3 segments as depicted at 1813, two of which are unchanged from the seed row, and one of which is changed. The pixel values in the unchanged segments are only known from the colour values associated with edges on the seed row which are incident with those segments. When the 1st segment of the current row is evaluated as depicted at 1814 along with incident edges from the seed row, as the $1^{st}$ segment of the current row is an unchanged segment, an edge 1820 from the seed row that is incident only on this segment is simply extended with the same x-offset on the current row as on the seed row.

The same applies to the 3rd segment as depicted at 1816, however in this case there is no incident edge to extend.

The 2nd segment is a changed segment, and hence contains pixels that are changed from the previous row. The $2^{nd}$ segment is evaluated for pixel runs, and then those runs checked for their effect on incident edges from the seed row 1815. The final result of applying the current row DRC term 1811 to the edges from the seed row 1810 is that all 3 edges are extended as depicted at 1817.

For clarity, the final result is shown 1817 with all pixel values, even those in unchanged segments which would not be decoded during evaluation of the current row.

FIGS. 18, 19, 20, 21, 22, 23, 24 and 25 show further examples of results of applying a DRC term to a seed row. Each diagram contains the "edges" from the seed row, along with a representation of the "seed-row", the "current-row" specified as a DRC term, with the "changed" pixels shown in the current row, and the "segments" of the current row that are used in generating edges, with the "result" showing the seed and current rows with associated edges. In each case the seed row is the same for all scenarios with the same set of edges and hence the same 16 pixels.

Figure 18:
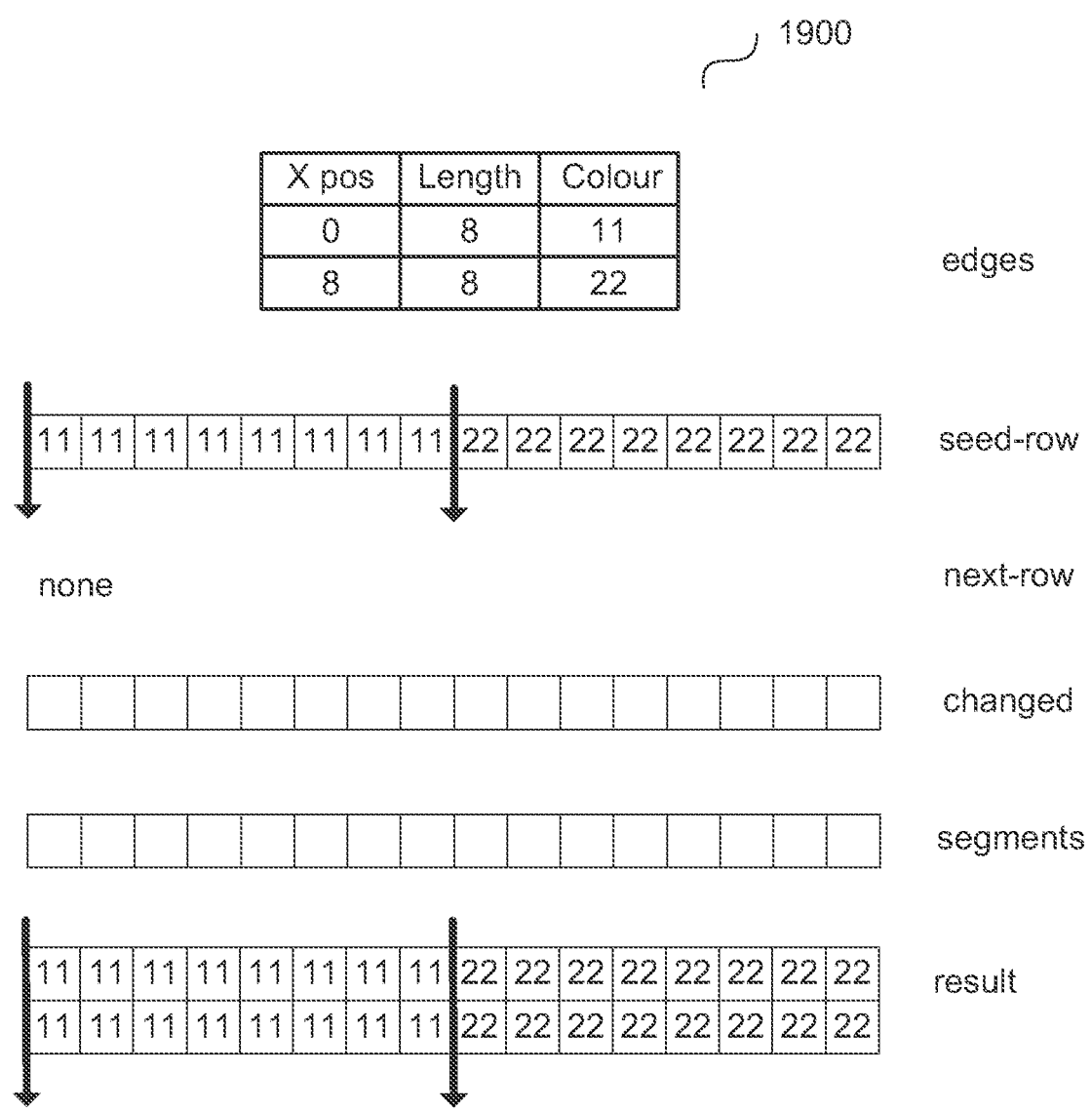
FIGS. 18, 19, 20, 21, 22, 23, 24 and 25 show various scenarios for transcoding a DRC image row to edges.

FIG. 18 shows a 1st scenario 1900. There is no current-row term to be applied, and hence no changed pixels, and nothing to be evaluated. The result is an extension of the existing edge from the seed-row.

Figure 21:
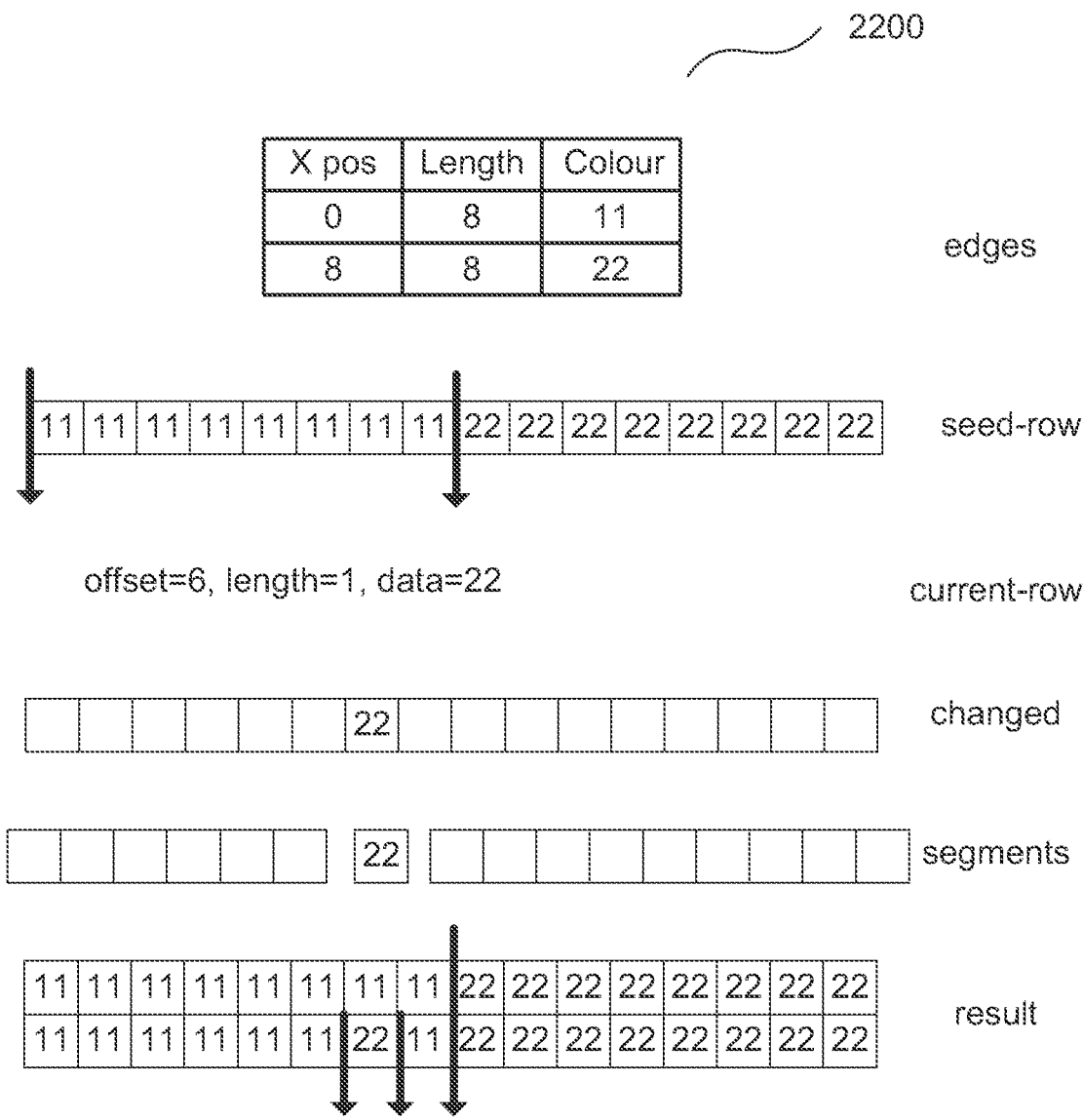

FIG. 21 shows a 2nd scenario 2200, in which the current-row term contains a single pixel at an x-offset which matches that of a pixel within a pixel run in the seed-row.

Figure 22:
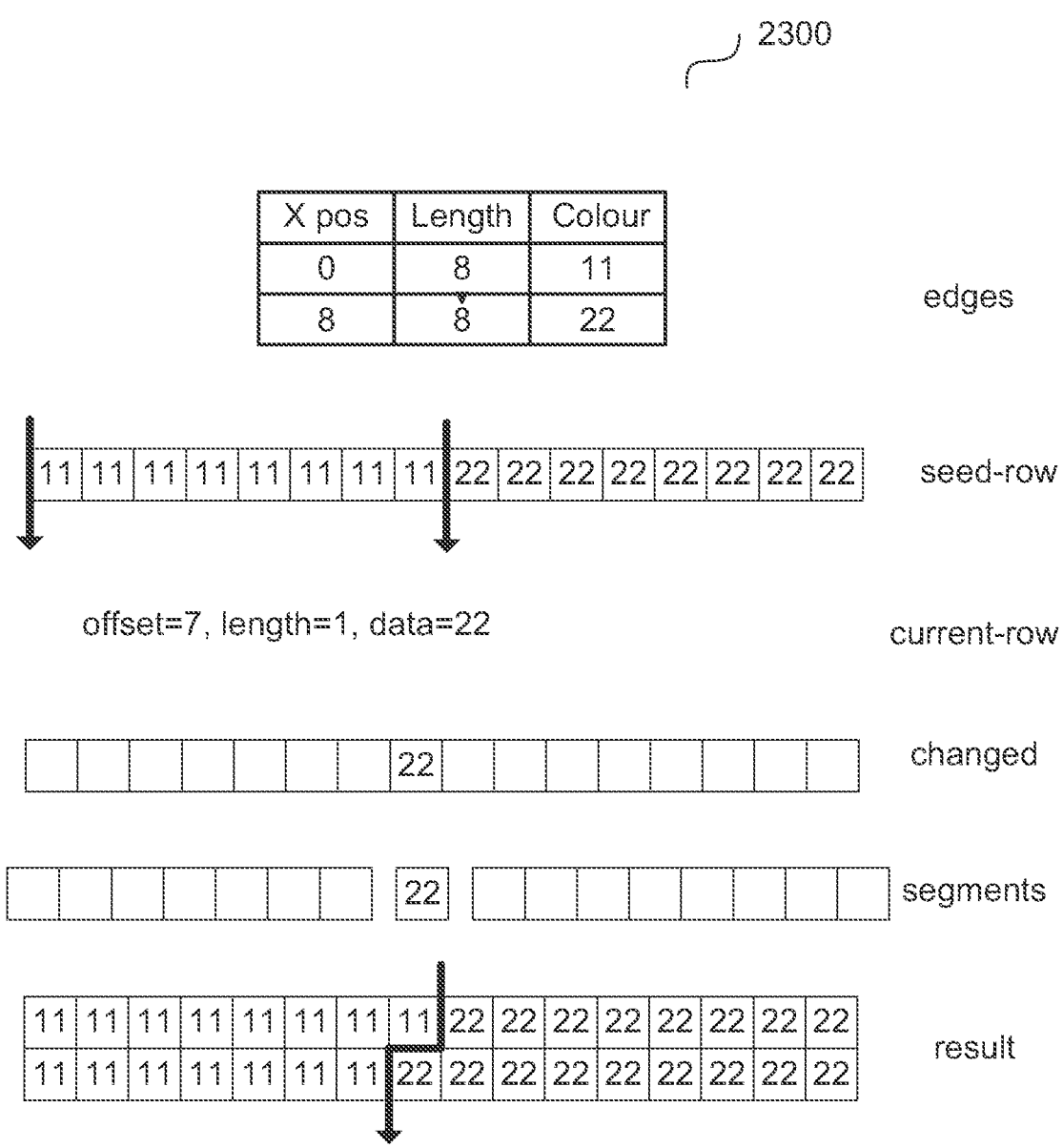

FIG. 22 shows a 3rd scenario 2300 in which the current-row term contains a single pixel at an x-offset which matches that of a pixel on the boundary of 2 pixel runs in the seed-row, and so it is also incident with the active edge.

Figure 19:
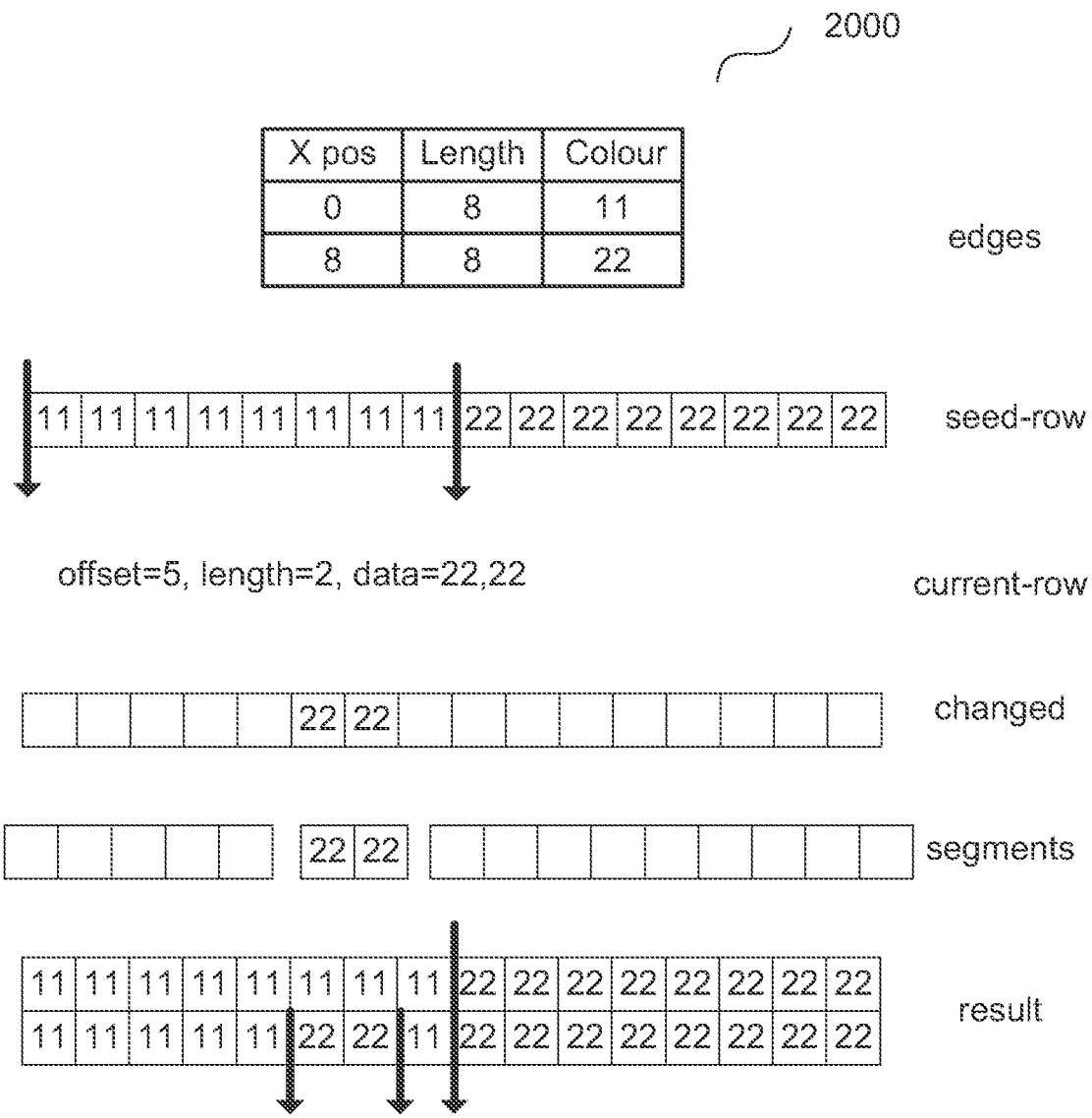

FIG. 19 shows a 4th scenario 2000 in which the current-row term contains 2 pixels at x-offsets which match those of 2 pixels within a pixel run on the seed-row.

Figure 23:
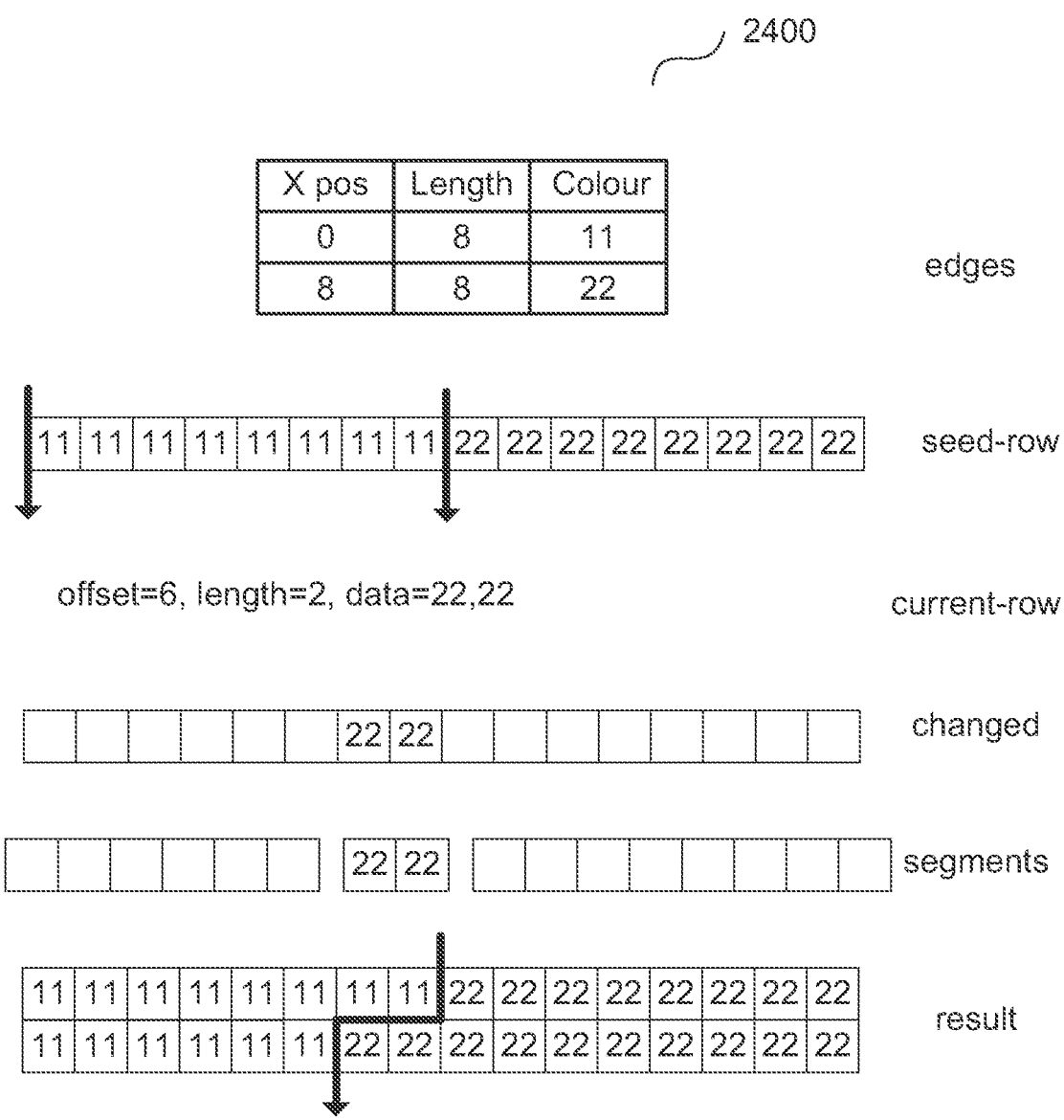

FIG. 23 shows a 5th scenario 2400 in which the current-row term contains 2 pixels at x-offsets which match those of 2 pixels spanning the boundary of 2 pixel runs on the seed-row, and so it is also incident with the active edge.

Figure 20:
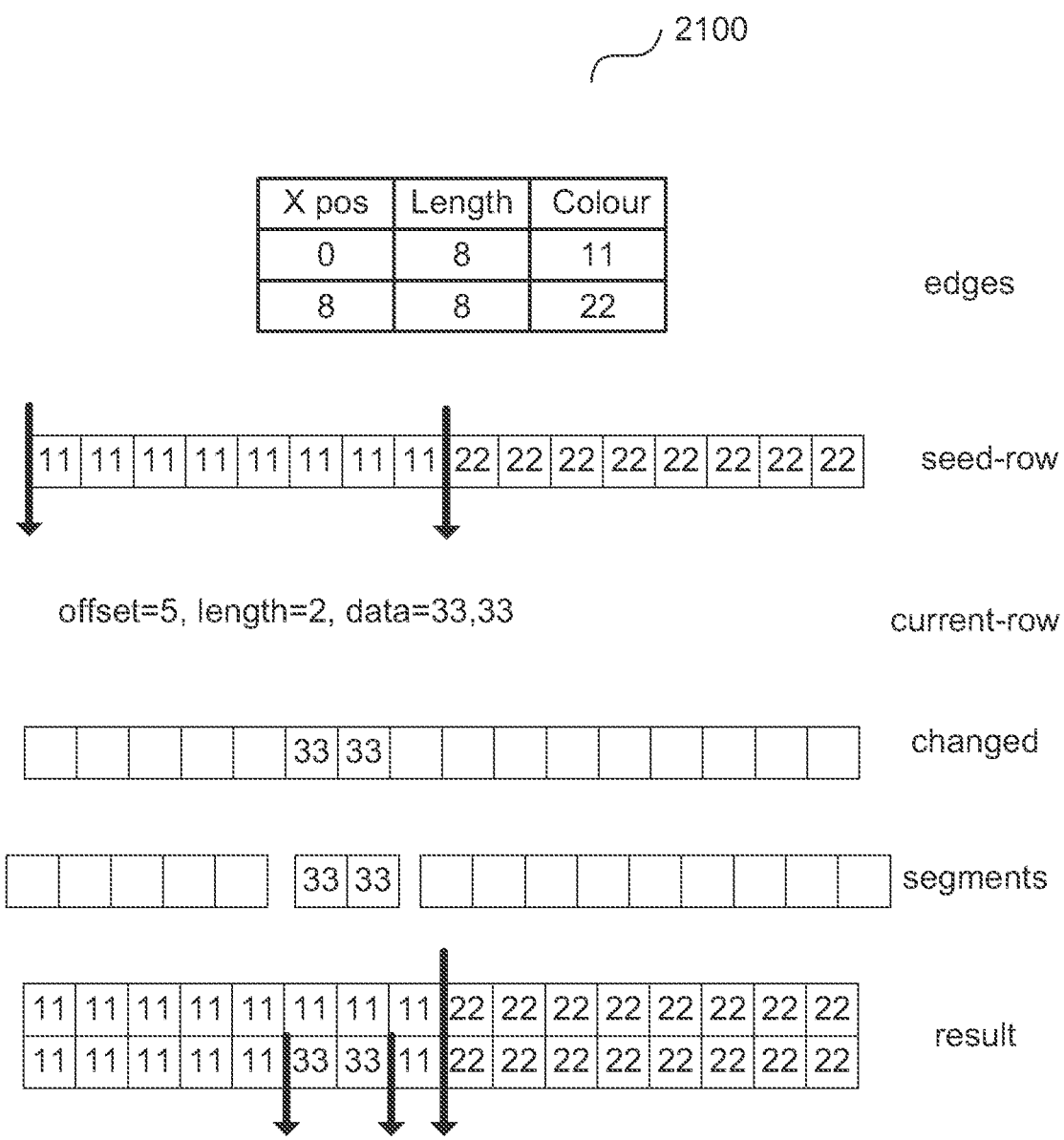

FIG. 20 shows a 6th scenario 2100 in which the current-row term contains 2 pixels at an x-offsets which match those of 2 pixels within a pixel run on the seed-row. The changed pixels have a colour that is different to both of the pixel runs in the seed-row.

Figure 24:
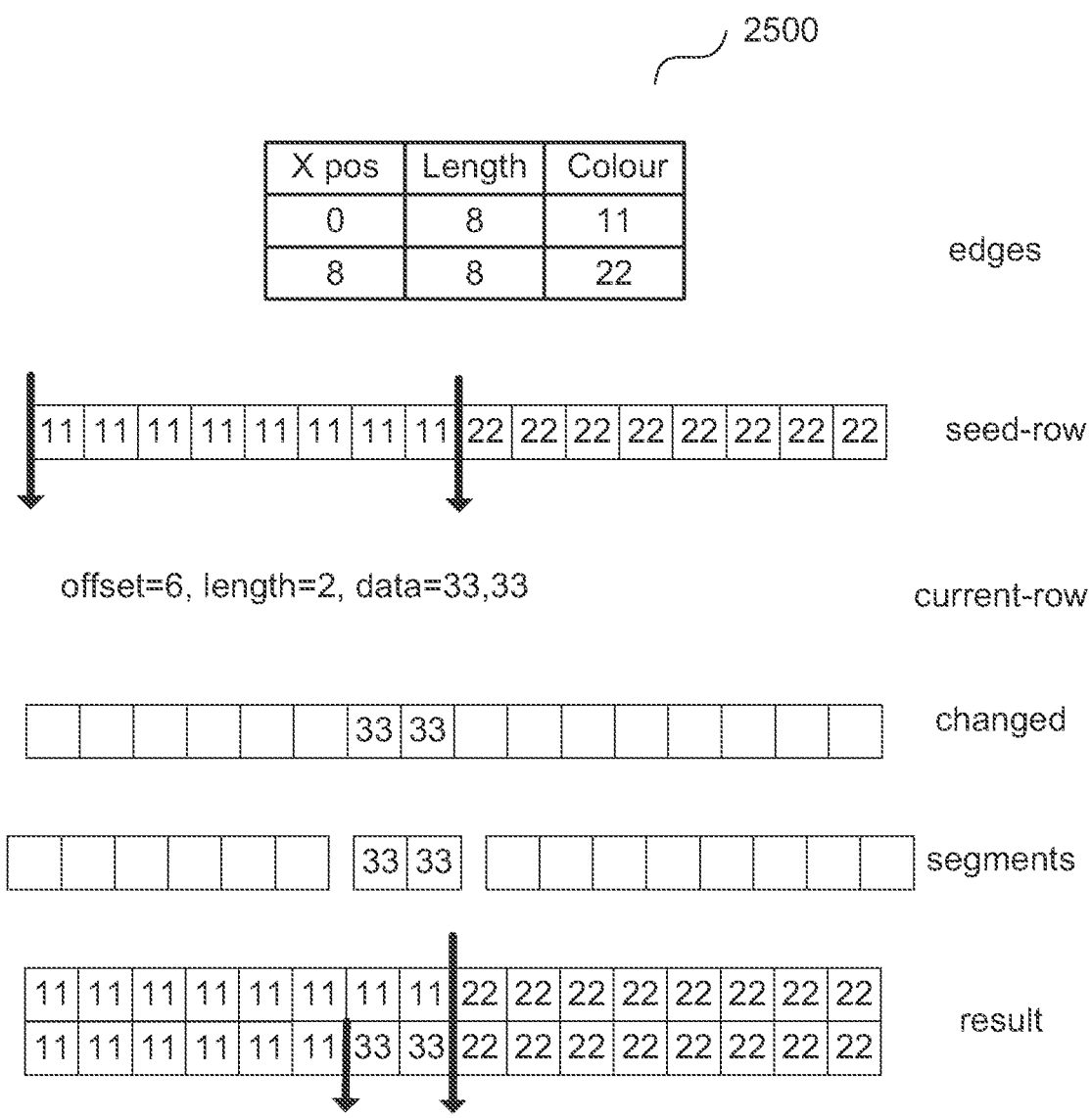

FIG. 24 shows a 7th scenario 2500 in which the current-row term contains 2 pixels at x-offsets which match those of 2 pixels within a pixel run of the seed row, and which are also on the boundary between that pixel run and another pixel run on the seed-row. The changed pixels have a colour that is different to both of the pixel runs in the seed-row.

Figure 25:
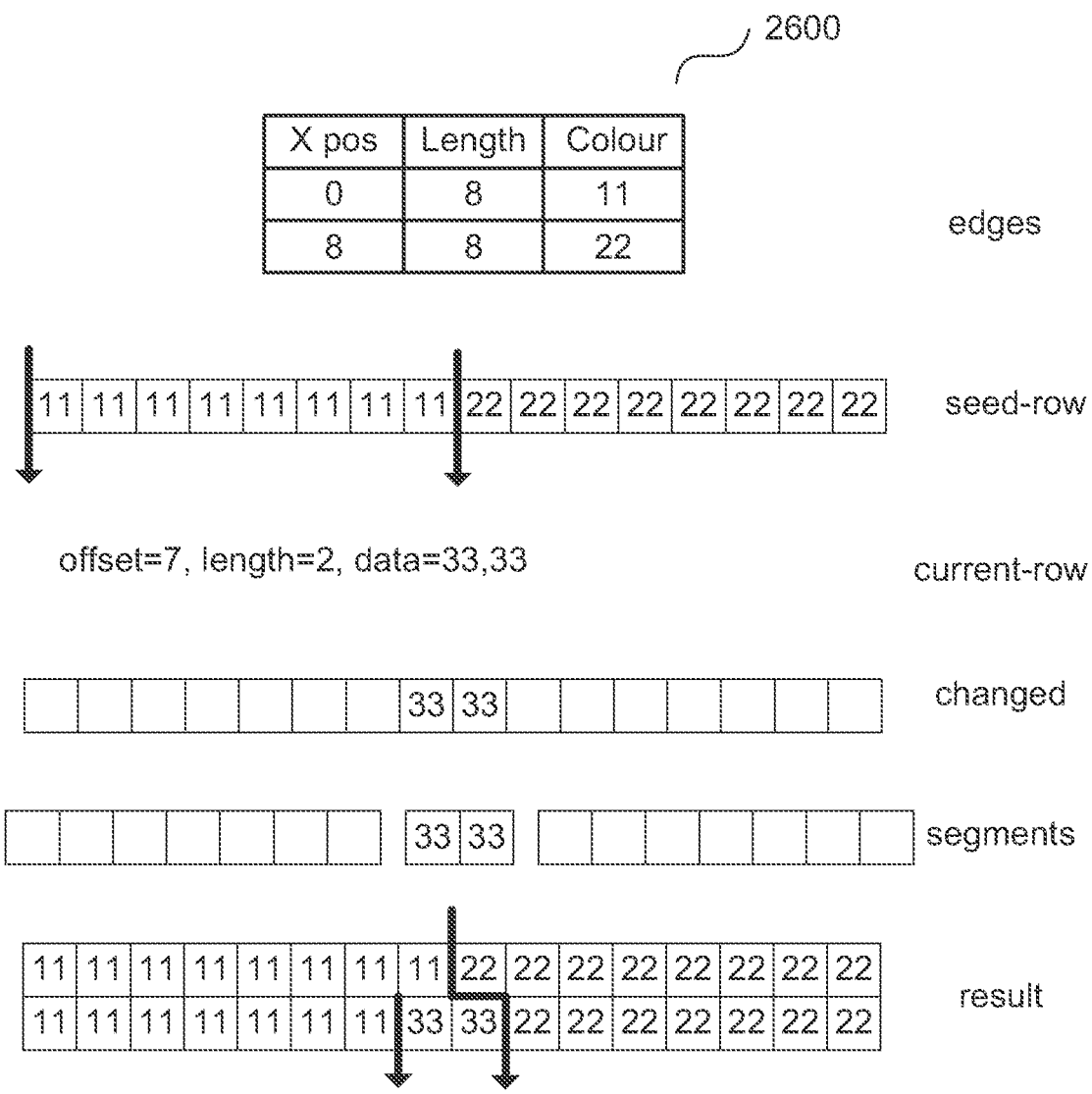

FIG. 25 shows an 8th scenario 2600 in which the current-row term contains 2 pixels at x-offsets which span the boundary of 2 pixel runs on the seed-row. The changed pixels have a colour that is different to both of the pixel runs in the seed-row.

INDUSTRIAL APPLICABILITY

The arrangements described are applicable to the computer and data processing industries and particularly for the image processing industry.

The foregoing describes only some embodiments of the present invention, and modifications and/or changes can be made thereto without departing from the scope and spirit of the invention, the embodiments being illustrative and not restrictive.

The invention claimed is:

1. A method of transcoding a delta row encoded image, the method comprising the steps of:
   receiving the delta row encoded image comprising terms each comprising an offset and replacement bytes for each changed portion to the exclusion of storing unchanged portions;
   subdividing the delta row encoded image into a plurality of delta row encoded tiles based on predetermined tile boundaries;
   determining, for a row of the delta row encoded image, terms comprising a tile offset and replacement bytes for each changed portion within a delta row encoded tile using the predetermined tile boundaries, stored offsets and replacement bytes, the tile offsets and the replacement bytes being determined to allow for independent processing of the differentially encoded tiles;
   determining edges within each of the delta row encoded tiles based on the determined tile offsets, bypassing an edge detection process for unchanged portions of the differentially encoded tile; and
   transcoding the delta row encoded image by encoding the identified edges.

2. The method according to claim 1, wherein the step of determining the terms comprising tile offset and replacement bytes for each changed portion within a delta row encoded tile comprises the steps of:
   determining tile-relative first row terms for a first row of the tile; and
   determining terms comprising tile offset and replacement bytes for each changed portion within the remaining rows of the tile.

3. The method according to claim 2, wherein the tile-relative first row terms for the first row of the tile comprise the pixel values of the first row of the tile.

4. The method according to claim 3, wherein the step of determining the terms comprising the tile offset and the replacement bytes for each changed portion within the remaining rows of the tile comprises the steps of:
   identifying a tile which encompasses a start of a current term on a current row, and an offset of a start of the term within the identified tile;
   determining if pixels defined by the term are wholly contained within the tile, and if so converting the offset to a tile-relative value; and
   if the pixels defined by the term are not wholly contained within the tile, extracting a section of the term that is contained within the identified tile.

5. The method according to claim 1, wherein the step of determining the edges within each of the delta row encoded tiles based on the determined tile offsets comprises the steps of:
   determining if a row is the first row of the tile and if so generating pixel runs for the first row and processing edges for the first row dependent upon the generated pixel runs; and
   if the row is not the first row of the tile generating pixel runs for terms of the row and processing edges for the row dependent upon the generated pixel runs.

6. The method according to claim 5, wherein the step of processing edges for a row dependent upon generated pixel runs comprises the steps of:
   determining if pixel run belongs to the first row of the tile and if so creating a new edge pair and setting the edge pair to an active state;
   if the pixel run does not belong to the first row of the tile determining if the pixel run can join an existing active edge pairs, and if so extending the active edge pair to encompass the pixel run; and if the pixel run does not belong to the first row of the tile and if the pixel run cannot join an existing active edge pair creating a new edge pair and setting the edge pair to an active state.

7. The method according to claim 6, comprising the further steps of:

determining if the pixel run extends past other active edge pairs within the tile thereby precluding them from continuing, and if so setting the affected edge pairs to an inactive state.

8. The method according to claim 5, wherein the step of generating a pixel run comprises the steps of:

(a) determining whether a pixel colour value is identical to an immediately preceding pixel colour value on the same row, wherein the row comprises a set of disjoint segments each containing one or more pixels runs;

(b) if the pixel colour value is identical to the immediately preceding pixel colour value, determining if a segment to which the pixel belongs has ended;

(c) if the segment to which the pixel belongs has not ended, incrementing a run length counter storing a length of the pixel run; and repeating the steps (a), (b) and (c).

9. The method according to claim 5, wherein if the row is not the first row of the tile, prior to the step of processing edges for the row dependent upon the generated pixel runs the method comprises the further steps of:

detecting an unchanged portion of a row using the offsets and the replacement bytes for said row;

for the detected unchanged portion, extending edges detected on a preceding row, the edges being extended with zero offset bypassing an edge detection process.

10. The method according to claim 1, wherein independent processing comprises processing of the delta row encoded tiles in parallel or asynchronously to determine edges within each of the delta row encoded tiles.

11. A system for transcoding a delta row encoded image, the system comprising:

a computer and a printer comprising one or more processors and one or more non-transitory tangible storage devices storing computer executable software programs for implementing a method comprising the steps of:

receiving the delta row encoded image comprising terms each comprising an offset and replacement bytes for each changed portion to the exclusion of storing unchanged portions;

subdividing the delta row encoded image into a plurality of delta row encoded tiles based on predetermined tile boundaries;

determining, for a row of the delta row encoded image, terms comprising a tile offset and replacement bytes for each changed portion within a delta row encoded tile using the predetermined tile boundaries, stored offsets and replacement bytes, the tile offsets and the replacement bytes being determined to allow for independent processing of the differentially encoded tiles;

determining edges within each of the delta row encoded tiles based on the determined tile offsets, bypassing an edge detection process for unchanged portions of the differentially encoded tile; and transcoding the delta row encoded image by encoding the identified edges.

12. One or more computer readable non-transitory tangible storage devices storing computer executable software programs for directing one or more processors to implementing a method for transcoding a delta row encoded image, the programs comprising:

computer executable code for receiving the delta row encoded image comprising terms each comprising an offset and replacement bytes for each changed portion to the exclusion of storing unchanged portions;

computer executable code for subdividing the delta row encoded image into a plurality of delta row encoded tiles based on predetermined tile boundaries;

computer executable code for determining, for a row of the delta row encoded image, terms comprising a tile offset and replacement bytes for each changed portion within a delta row encoded tile using the predetermined tile boundaries, stored offsets and replacement bytes, the tile offsets and the replacement bytes being determined to allow for independent processing of the differentially encoded tiles;

computer executable code for determining edges within each of the delta row encoded tiles based on the determined tile offsets, bypassing an edge detection process for unchanged portions of the differentially encoded tile; and computer executable code for transcoding the delta row encoded image by encoding the identified edges.

* * * * *